(12) United States Patent
Hatada

(10) Patent No.: US 7,532,412 B2
(45) Date of Patent: May 12, 2009

(54) ZOOM LENS HAVING IMAGE STABILIZING FUNCTION

(75) Inventor: Takahiro Hatada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/038,669

(22) Filed: Feb. 27, 2008

(65) Prior Publication Data

US 2008/0212206 A1   Sep. 4, 2008

(30) Foreign Application Priority Data

Mar. 1, 2007   (JP) .............................. 2007-051331

(51) Int. Cl.
*G02B 15/14* (2006.01)

(52) U.S. Cl. ................. 359/688; 359/686; 359/676; 359/557

(58) Field of Classification Search ............. 359/676, 359/683, 686, 688, 555–557

See application file for complete search history.

(56) References Cited

U.S. PATENT DOCUMENTS

| 5,760,957 | A | * | 6/1998 | Suzuki | ..................... 359/557 |
| 6,025,962 | A | | 2/2000 | Suzuki | |
| 6,046,852 | A | | 4/2000 | Konno | |
| 6,266,189 | B1 | | 7/2001 | Konno | |
| 7,068,428 | B2 | | 6/2006 | Misaka | |
| 7,253,965 | B2 | | 8/2007 | Shibayama et al. | |
| 2005/0275949 | A1 | | 12/2005 | Fujimoto et al. | |

FOREIGN PATENT DOCUMENTS

JP   2003-295060   10/2003

* cited by examiner

*Primary Examiner*—Darryl J Collins
(74) *Attorney, Agent, or Firm*—Canon USA Inc I.P. Div

(57) ABSTRACT

A zoom lens includes, in order from object to image sides, first and second lens units having positive and negative refractive power, respectively, and a rear lens group including at least one lens unit having positive refractive power. The rear lens group includes a lens unit IS having negative refractive power and movable in a direction having a component perpendicular to an optical axis so as to displace an imaging position, and a lens unit R_IS having positive refractive power and arranged on the image side of the lens unit IS. The distance between the lens units IS and R_IS is varied during zooming. The following conditions are satisfied:

$$0.05 < |fIS/fT| < 0.18$$

$$2.0 < f1/fR\_IS < 4.5$$

where fIS, fT, f1, and fR_IS are focal lengths of the lens unit IS, entire zoom lens at a telephoto end, first lens unit, and lens unit R_IS, respectively.

10 Claims, 31 Drawing Sheets

ZOOM LENS HAVING IMAGE STABILIZING FUNCTION

BACKGROUND OF THE INVENTION

1. Field of the Invention

The present invention relates to a zoom lens having an image stabilizing function for use in an image pickup apparatus, such as a single-lens reflex camera, a digital camera, a video camcorder, or a film camera.

2. Description of the Related Art

As a photographing optical system included in an image pickup apparatus (e.g., digital camera or video camcorder), a zoom lens is desired to be compact, have a high zoom ratio, and provide high imaging performance throughout the entire zoom range.

As a zoom lens with a wide zoom range and a high zoom ratio, there is known a telephoto zoom lens having a long focal length at the telephoto end. The telephoto zoom lens tends to be large in overall size and weight.

When a zoom lens is inclined due to vibration, the imaging position is displaced (or the photographed image is blurred) by an amount according to the angle of the inclination and a focal length corresponding to the zooming position at the time when the zoom lens was inclined.

Therefore, in the telephoto zoom lens described above, hand-induced shake (or vibration in the zoom lens) during photographing can cause significant blur in the photographed image.

Telephoto zoom lens having an image stabilizing function is known. In such a telephoto zoom lens, at least one of the lens units is moved in a direction substantially perpendicular to the optical axis so as to compensate (or correct) for image blur caused by vibration.

Among zoom lenses of this type is a four-unit zoom lens which includes four lens units having positive, negative, positive, and positive refractive power in order from the object side to the image side, and in which a lens subunit constituting part of the third lens unit is moved in a direction perpendicular to the optical axis to compensate for image blur (see, for example, U.S. Pat. No. 7,253,965 and U.S. Pat. No. 6,046,852).

Also, there is known a five-unit zoom lens which includes five lens units having positive, negative, positive, negative, and positive refractive power in order from the object side to the image side, and in which the fourth lens unit is moved in a direction perpendicular to the optical axis to compensate for image blur (see, for example, U.S. Pat. No. 6,025,962).

There is also known a six-unit zoom lens which includes six lens units having positive, negative, positive, positive, negative, and positive refractive power in order from the object side to the image side, and in which the fifth lens unit is moved in a direction perpendicular to the optical axis to compensate for image blur (see, for example, U.S. Pat. No. 7,068,428 and U.S. Pat. No. 6,266,189).

In such a zoom lens with an image stabilizing function, it is generally desired that the achieved amount of image blur correction be large, and that the required amount of movement of an image stabilizing lens unit for correcting (or compensating) for image blur be small. If the lens arrangement in the image stabilizing lens unit, which is moved for image stabilization, is not appropriate, the amount of eccentric aberration (i.e., aberration caused by eccentricity) that occurs during image stabilization increases. This causes degradation in optical performance during image stabilization. Therefore, for a zoom lens with an image stabilizing function, it is desired that the amount of eccentric aberration that occurs during image stabilization be small. At the same time, it is desired that a significant amount of image blur correction be achieved with a small amount of movement of the image stabilizing lens unit. In other words, it is desired to achieve a high level of vibration control sensitivity, which is the ratio of the amount of image blur correction ($\Delta X$) to the unit amount of movement of the image stabilizing lens unit ($\Delta H$), $\Delta X/\Delta H$.

In a telephoto zoom lens with a high zoom ratio, a larger amount of eccentric aberration tends to occur on the telephoto side during image stabilization, and it is difficult to correct such aberration.

Therefore, for a telephoto zoom lens having an image stabilizing function, it is important to reduce the amount of eccentric aberration during image stabilization by choosing an appropriate overall lens arrangement and an appropriate lens arrangement in the image stabilizing lens unit, which is moved for image stabilization.

In particular, eccentric aberration that occurs in the image stabilizing lens unit is formed on the image plane at the imaging magnification of a lens unit arranged on the image side of the image stabilizing lens unit.

Therefore, for a telephoto zoom lens having an image stabilizing function, it is important to appropriately configure the image stabilizing lens unit and the lens unit arranged on the image side of the image stabilizing lens unit.

SUMMARY OF THE INVENTION

The present invention provides a zoom lens including a mechanism for compensation of vibration (or for image stabilization) and having an image stabilizing function that makes it possible to realize a high-quality image through the compensation of vibration.

According to an aspect of the present invention, a zoom lens includes, in order from an object side to an image side, a first lens unit having positive refractive power, a second lens unit having negative refractive power, and a rear lens group including at least one lens unit having positive refractive power. The rear lens group includes a lens unit IS having negative refractive power which is movable in a direction having a component perpendicular to an optical axis so as to displace an imaging position, and a lens unit R_IS having positive refractive power and arranged on the image side of the lens unit IS. The distance between the lens unit IS and the lens unit R_IS is variable during zooming. The following conditions are satisfied:

$$0.05 < |fIS/fT| < 0.18$$

$$2.0 < f1/fR\_IS < 4.5$$

where fIS is a focal length of the lens unit IS, fT is a focal length of the entire zoom lens at a telephoto end, f1 is a focal length of the first lens unit, and fR_IS is a focal length of the lens unit R_IS.

Further features of the present invention will become apparent from the following description of exemplary embodiments with reference to the attached drawings.

DESCRIPTION OF THE EMBODIMENTS

Exemplary embodiments of a zoom lens according to the present invention and an image pickup apparatus including the zoom lens will now be described.

A zoom lens of the present invention includes, in order from the object side to the image side, a first lens unit (L1) having positive refractive power, a second lens unit (L2) having negative refractive power, and a rear lens group (Lr) including at least one lens unit having positive refractive power. The rear lens group includes a lens unit (image stabilizing lens unit) IS having negative refractive power and a lens unit R_IS having positive refractive power. The lens unit IS is movable in a direction having a component perpendicular to the optical axis so as to displace the imaging position. The lens unit R_IS is arranged on the image side of the lens unit IS and is movable for zooming. During zooming, the distance between the lens unit IS and the lens unit R_IS is varied.

The zoom lens of each embodiment is a photographing lens system included in an image pickup apparatus, such as a video camcorder, a digital camera, or a silver-halide film camera. The zoom lens may be releasably secured to the camera body.

In the cross-sectional views, the object (front) side is on the left and the image (rear) side is on the right. In these cross-sectional views, L1 denotes the i-th lens unit from the object side; and Lr denotes a rear lens group including a plurality of lens units.

The cross-sectional views of FIG. 1, FIG. 11, FIG. 16, and FIG. 21 each illustrate a first lens unit L1 having positive refractive power, a second lens unit L2 having negative refractive power, and a rear lens group Lr. The rear lens group Lr includes a third lens unit L3 having positive refractive power, a fourth lens unit L4 having negative refractive power, and a fifth lens unit L5 having positive refractive power. The fourth lens unit L4 is a lens unit in which a lens unit (image stabilizing lens unit) having negative refractive power and constituting all or part of the fourth lens unit L4 is movable in a direction having a component perpendicular to the optical axis, so as to displace the imaging position.

The term "refractive power" used herein refers to optical power and is the reciprocal of the focal length.

Figure 6:
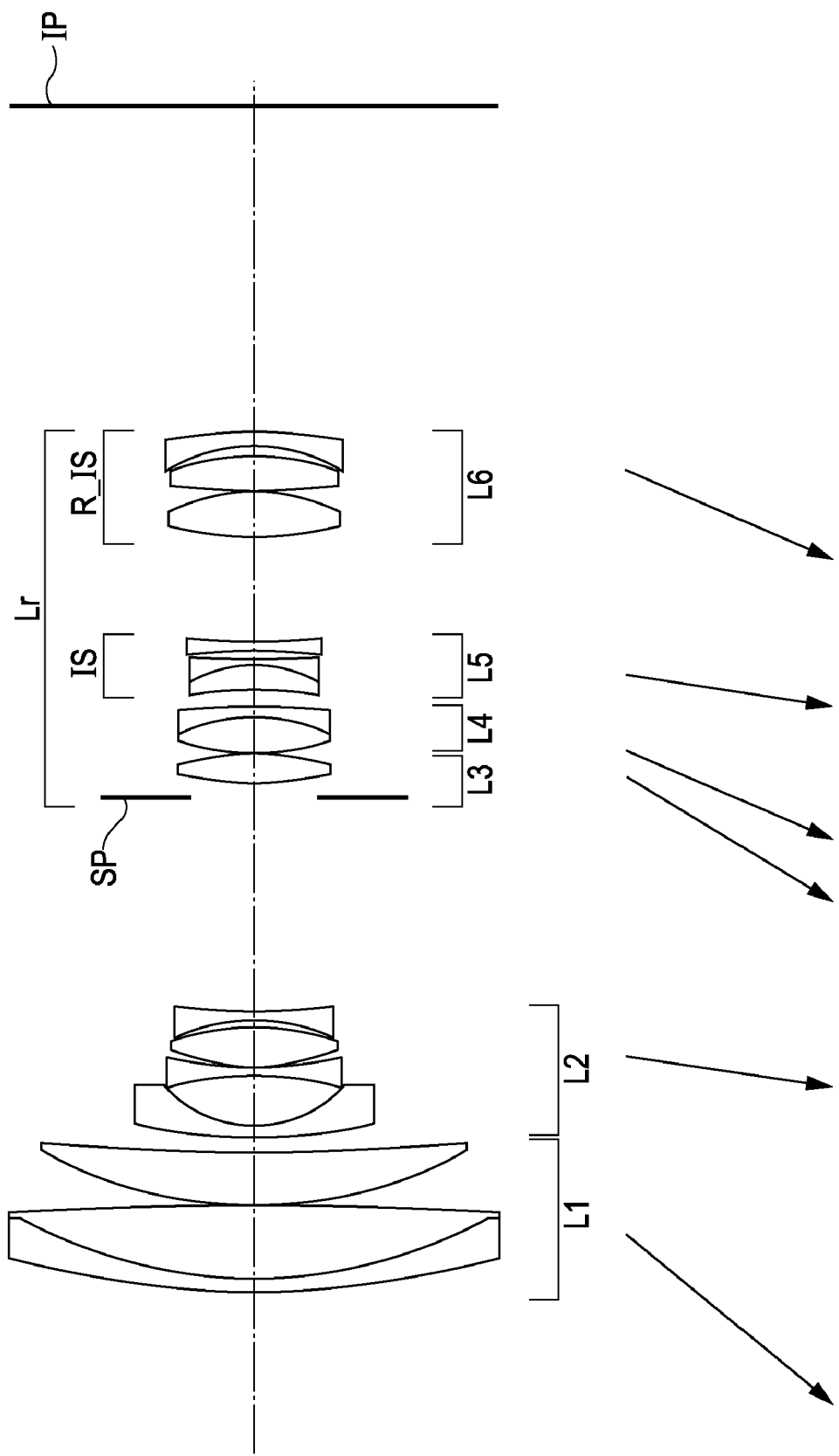
FIG. 6 is a cross-sectional view of a zoom lens according to embodiment 2 of the present invention and illustrates a state in which an object at infinity is in focus at the wide-angle end.
Figure 7:
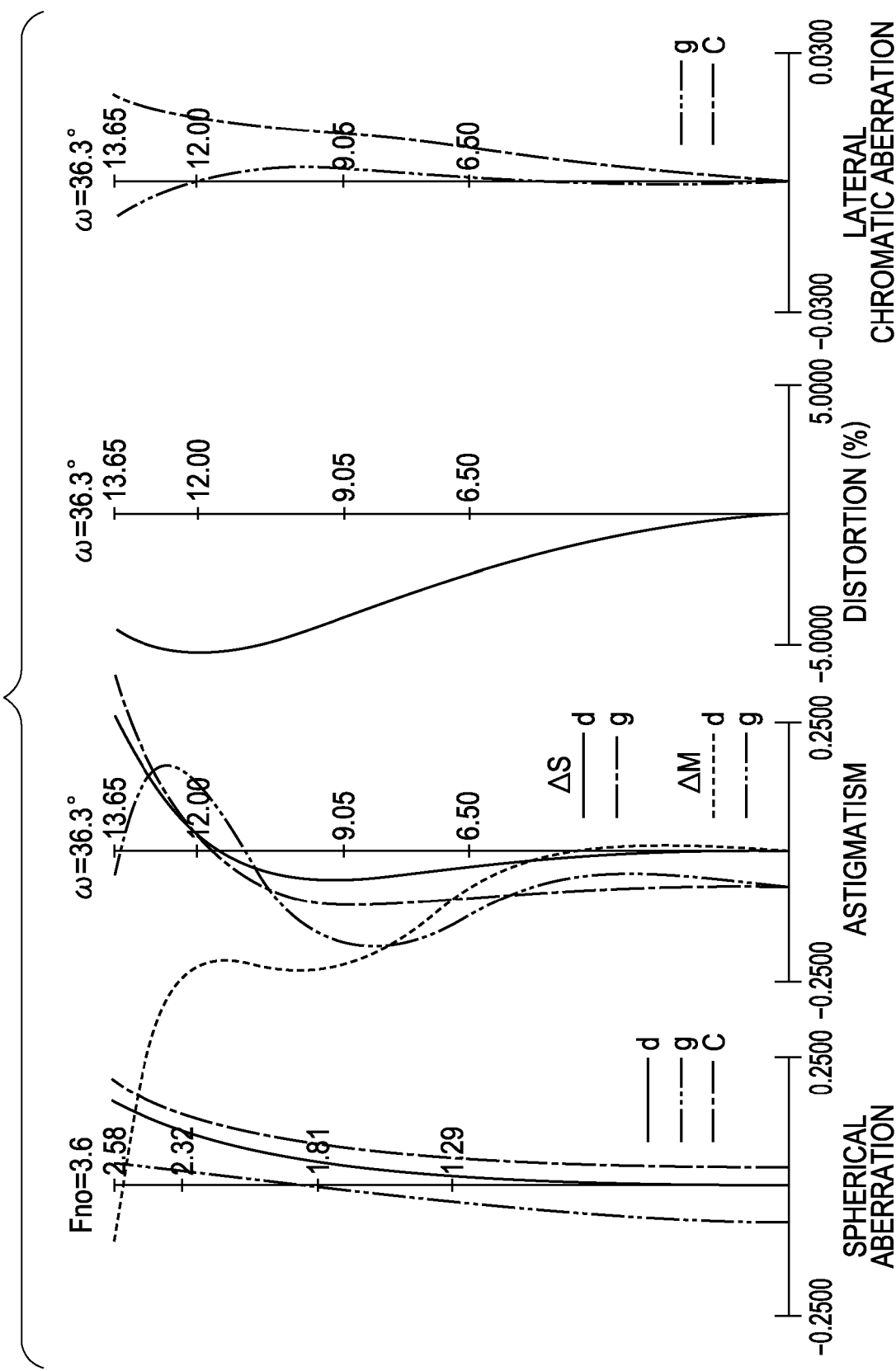
FIG. 7 shows longitudinal aberrations that occur when an object at infinity is in focus at the wide-angle end of the zoom lens of embodiment 2.
Figure 8:
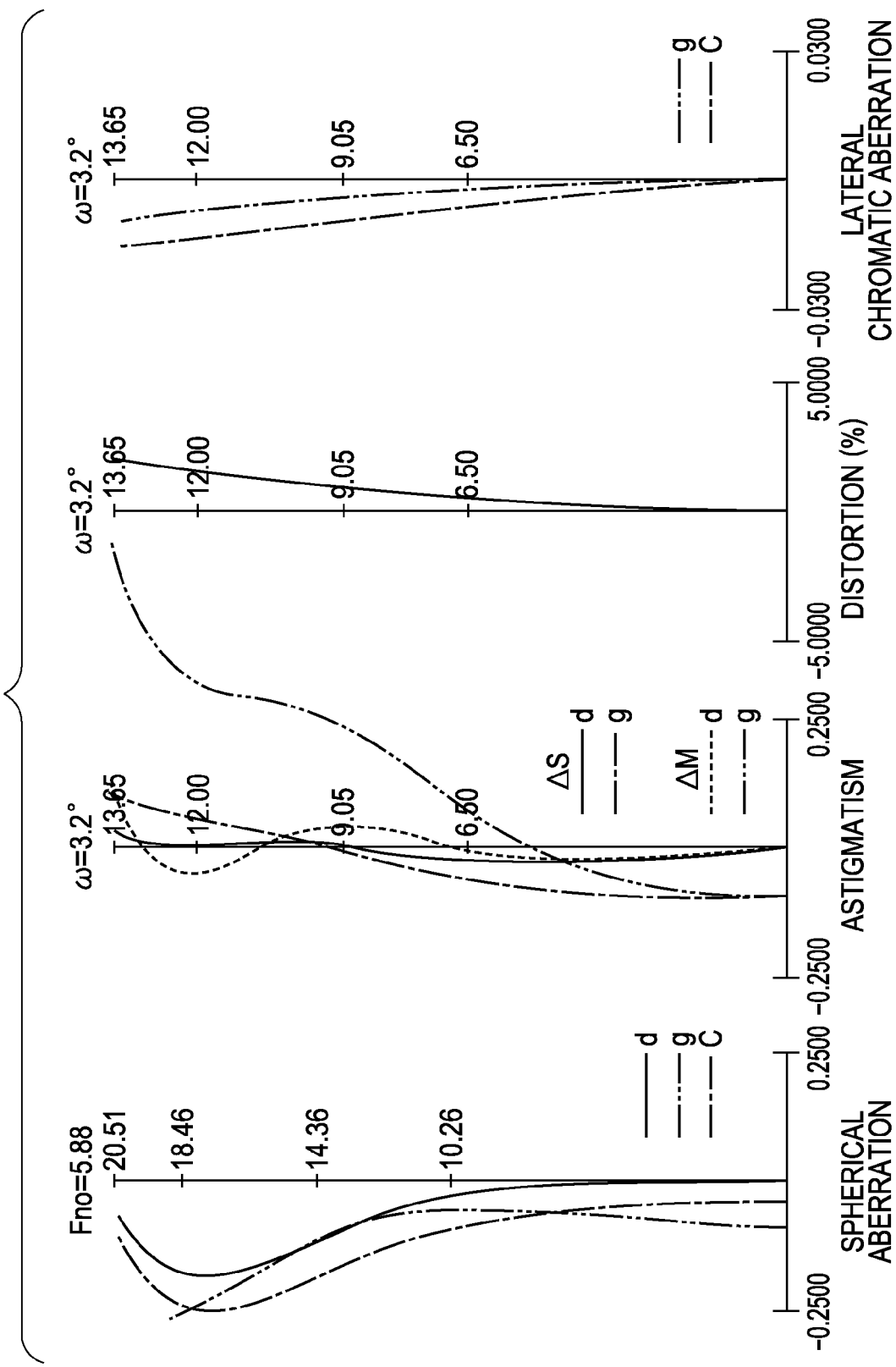
FIG. 8 shows longitudinal aberrations that occur when an object at infinity is in focus at the telephoto end of the zoom lens of embodiment 2.
Figure 9:
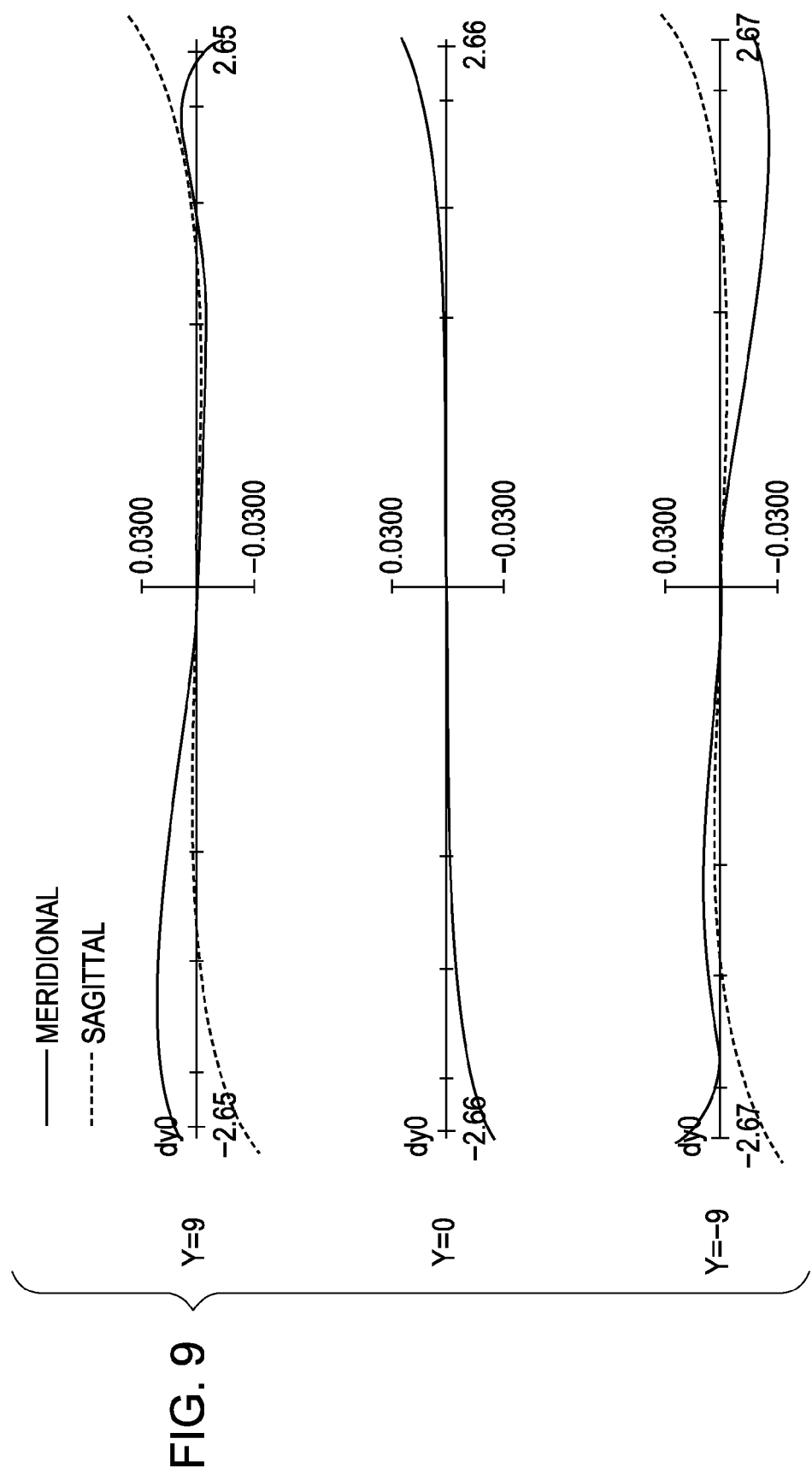
FIG. 9 shows lateral aberrations that occur when an object at infinity is in focus at the wide-angle end of the zoom lens of embodiment 2 and image stabilization is performed with the zoom lens inclined at 0.3°.
Figure 10:
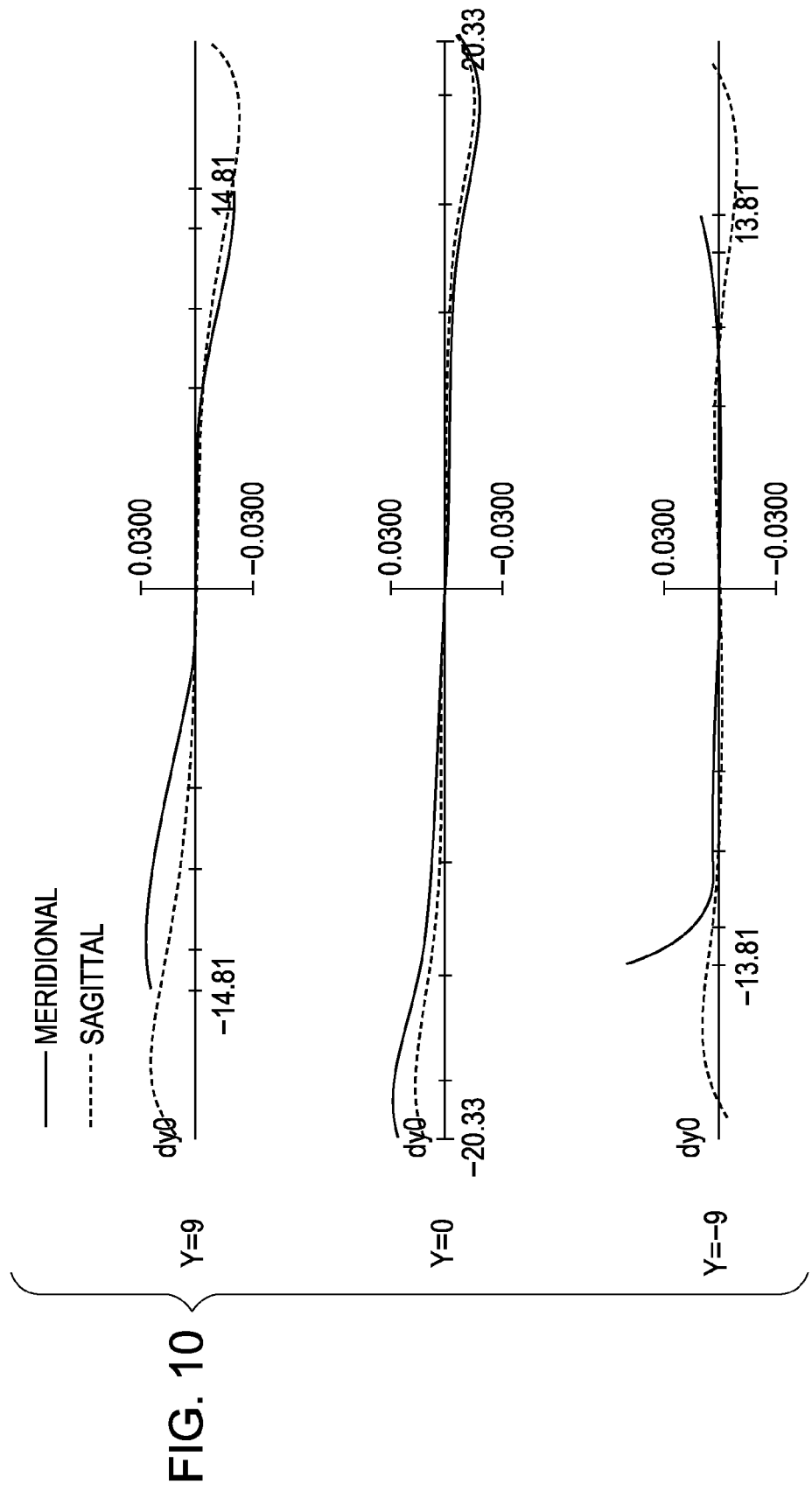
FIG. 10 shows lateral aberrations that occur when an object at infinity is in focus at the telephoto end of the zoom lens of embodiment 2 and image stabilization is performed with the zoom lens inclined at 0.3°.

The cross-sectional view of FIG. 6 illustrates a first lens unit L1 having positive refractive power, a second lens unit L2 having negative refractive power, and a rear lens group Lr. The rear lens group Lr includes a third lens unit L3 having positive refractive power, a fourth lens unit L4 having positive refractive power, a fifth lens unit L5 having negative refractive power, and a sixth lens unit L6 having positive refractive power. The fifth lens unit L5 is a lens unit (image stabilizing lens unit) movable in a direction having a component perpendicular to the optical axis, so as to displace the imaging position.

Figure 26:
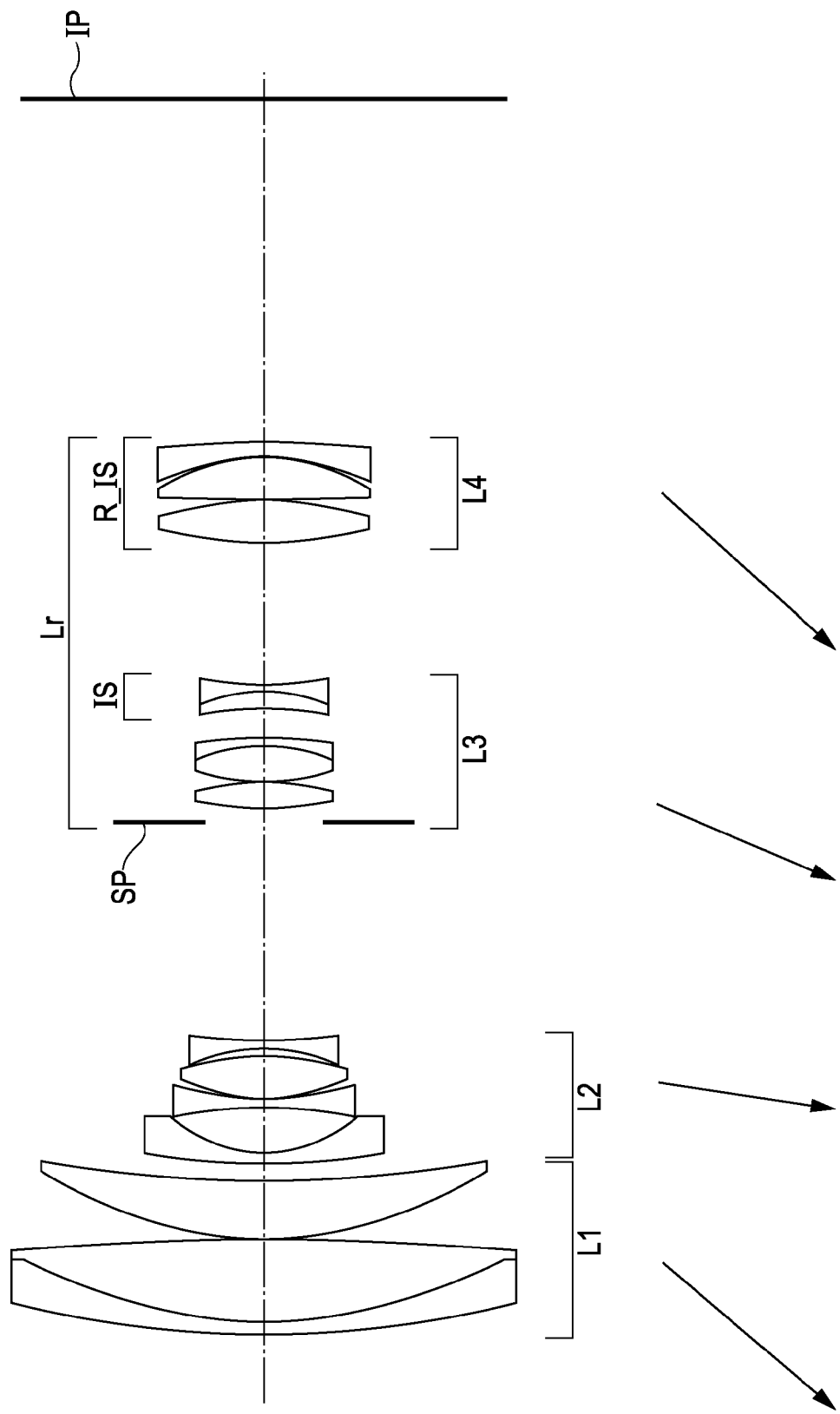
FIG. 26 is a cross-sectional view of a zoom lens according to embodiment 6 of the present invention and illustrates a state in which an object at infinity is in focus at the wide-angle end.
Figure 27:
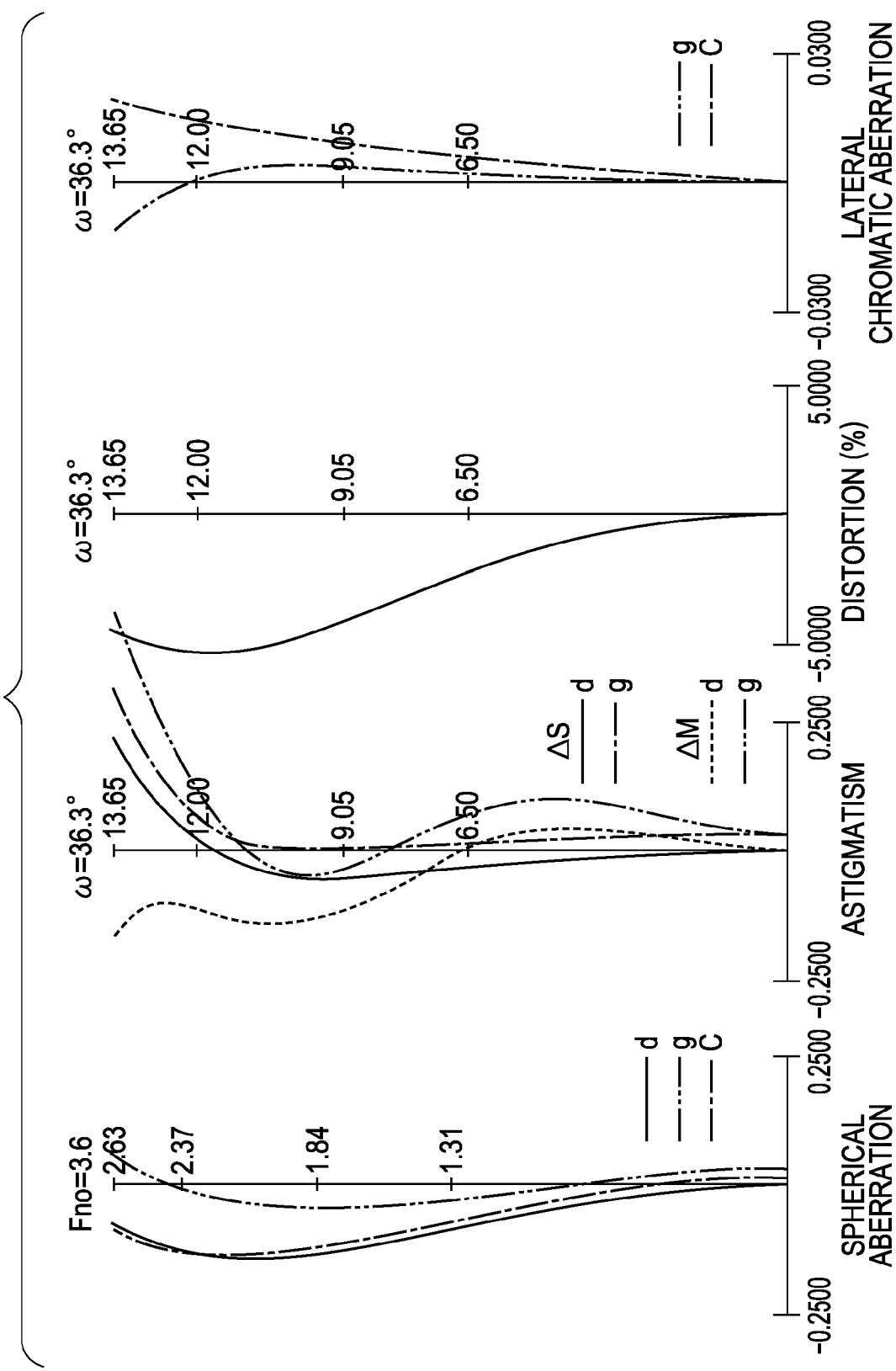
FIG. 27 shows longitudinal aberrations that occur when an object at infinity is in focus at the wide-angle end of the zoom lens of embodiment 6.
Figure 28:
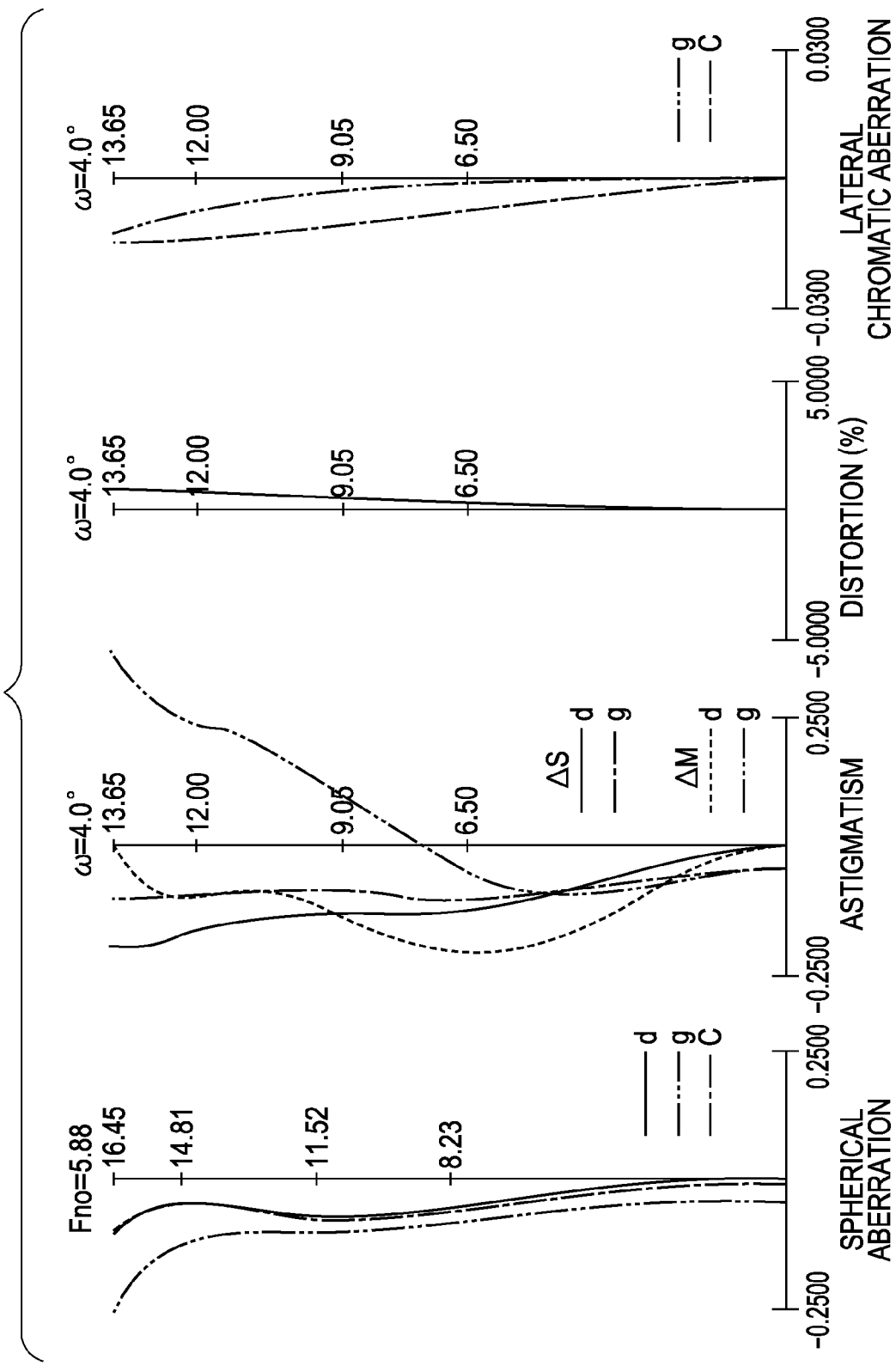
FIG. 28 shows longitudinal aberrations that occur when an object at infinity is in focus at the telephoto end of the zoom lens of embodiment 6.
Figure 29:
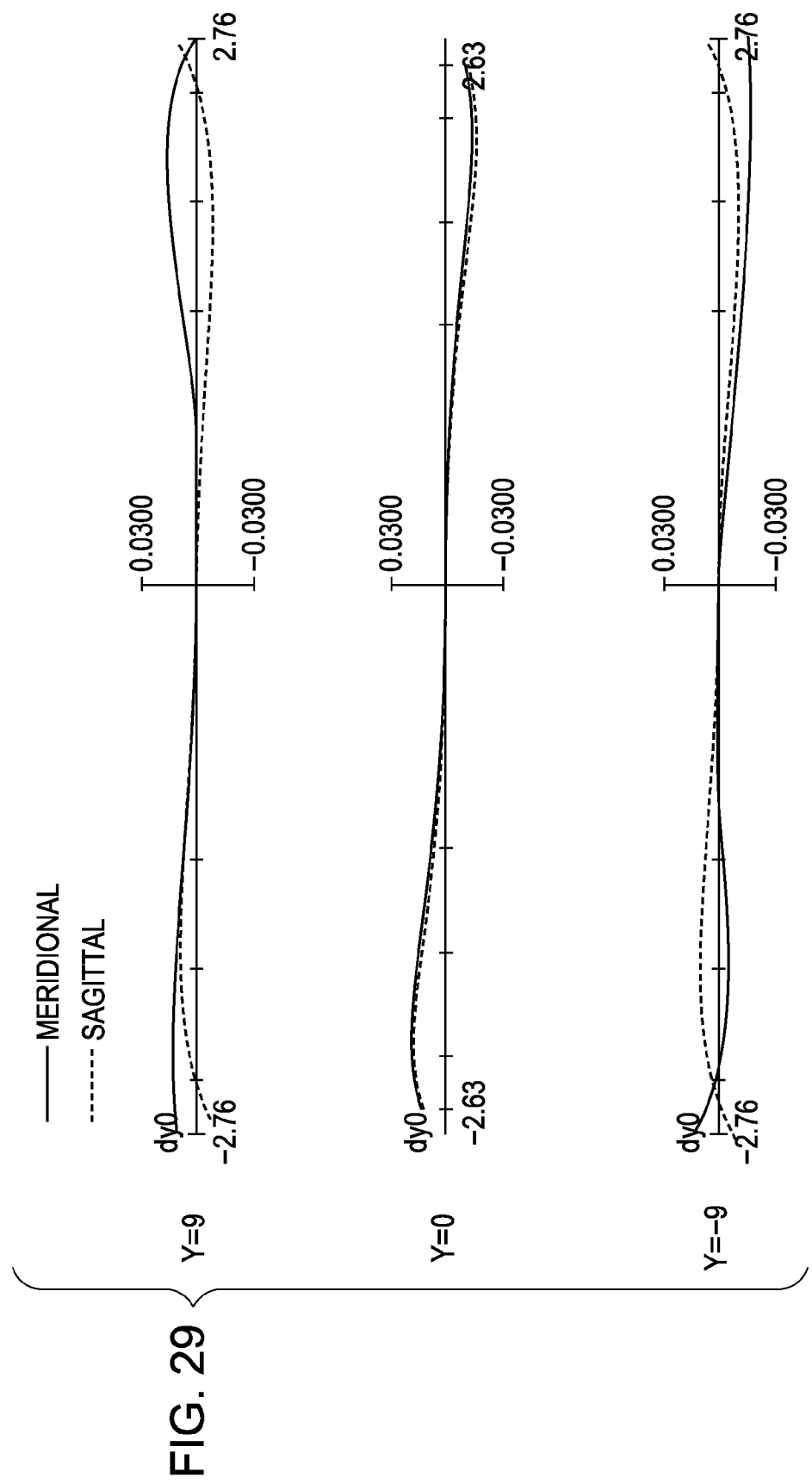
FIG. 29 shows lateral aberrations that occur when an object at infinity is in focus at the wide-angle end of the zoom lens of embodiment 6 and image stabilization is performed with the zoom lens inclined at 0.3°.
Figure 30:
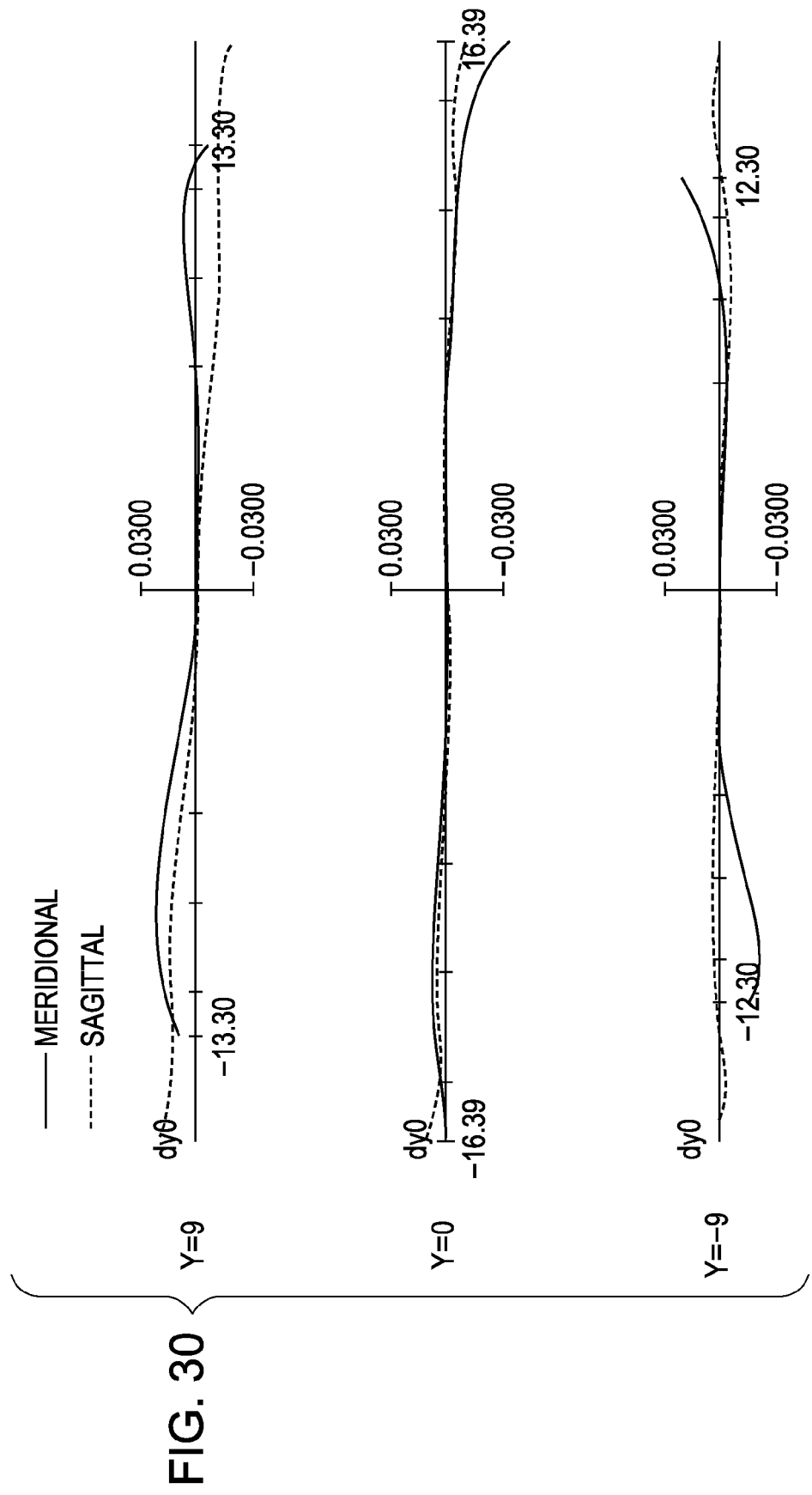
FIG. 30 shows lateral aberrations that occur when an object at infinity is in focus at the telephoto end of the zoom lens of embodiment 6 and image stabilization is performed with the zoom lens inclined at 0.3°.

The cross-sectional view of FIG. 26 illustrates a first lens unit L1 having positive refractive power, a second lens unit L2 having negative refractive power, and a rear lens group Lr. The rear lens group Lr includes a third lens unit L3 having positive refractive power and a fourth lens unit L4 having positive refractive power. The third lens unit L3 is a lens unit in which a part of the third lens unit having negative refractive power is movable in a direction having a component perpendicular to the optical axis, so as to displace the imaging position.

Each cross-sectional view of the zoom lens also illustrates an aperture stop SP and an image plane IP. The aperture stop SP is either arranged on the object side of the rear lens group Lr, or arranged in the rear lens group Lr. In the embodiments described below, the aperture stop SP is located on the object side of the third lens unit L3. A photosensitive surface is located at the position of the image plane IP. When the zoom lens is used as a photographing optical system for a video camcorder or a digital still camera, the photosensitive surface corresponds to an image pickup surface of a solid-state image pickup element (photoelectric conversion element), such as a charge-coupled device (CCD) sensor or a complementary metal oxide semiconductor (CMOS) sensor. When the zoom lens is used as a photographing optical system for a silver-halide film camera, the photosensitive surface corresponds to a film surface in the camera.

In the diagrams showing longitudinal aberrations, d, g, and C denote a d-line, a g-line, and a C-line, respectively; ΔM and ΔS denote a meridional image plane and a sagittal image plane, respectively; ω denotes a half angle of view; and Fno denotes an F-number. A lateral chromatic aberration is indicated by the g-line and C-line.

In the diagrams showing lateral aberrations, Y denotes the height of an image; a solid line and a dashed line indicate a meridional image plane and a sagittal image, respectively; and the horizontal axis represents the height on the pupil plane.

In the embodiments described below, the terms "wide-angle end" and "telephoto end" refer to zooming positions at the time when lens units (magnification-varying lens units) are located at either end of a mechanically movable range along the optical axis. The locus of movement of each lens unit during zooming from the wide-angle end to the telephoto end is indicated by an arrow in the cross-sectional view Figures.

In embodiments 1, 3, 4, and 5 illustrated in FIGS. 1, 11, 16, and 21, respectively, the zoom lens includes, in order from the object side to the image side, the first lens unit L1 having positive refractive power, the second lens unit L2 having negative refractive power, the third lens unit L3 having positive refractive power, the fourth lens unit L4 having negative refractive power, and the fifth lens unit L5 having positive refractive power. During zooming, distances between the lens units are varied. More specifically, during zooming from the wide-angle end to the telephoto end, as indicated by arrows, the first lens unit L1 is moved to the object side; the second lens unit L2 is moved to increase the distance between the second lens unit L2 and the first lens unit L1; the third lens unit L3 is moved to the object side to reduce the distance between the third lens unit L3 and the second lens unit L2; the fourth lens unit L4 is moved to the object side to increase the distance between the fourth lens unit L4 and the third lens unit L3; and the fifth lens unit L5 is moved to the object side to reduce the distance between the fifth lens unit L5 and the fourth lens unit L4. The aperture stop SP is moved together with the third lens unit L3. Alternatively, the aperture stop SP may be moved independent of the lens units during zooming.

In embodiment 2 illustrated in FIG. 6, the zoom lens includes, in order from the object side to the image side, the first lens unit L1 having positive refractive power, the second lens unit L2 having negative refractive power, the third lens unit L3 having positive refractive power, the fourth lens unit L4 having positive refractive power, the fifth lens unit L5 having negative refractive power, and the sixth lens unit L6 having positive refractive power. During zooming, distances between the lens units are varied. More specifically, during zooming from the wide-angle end to the telephoto end, as indicated by arrows, the first lens unit L1 is moved to the object side; the second lens unit L2 is moved to increase the distance between the second lens unit L2 and the first lens unit L1; the third lens unit L3 is moved to the object side to reduce the distance between the third lens unit L3 and the second lens unit L2; the fourth lens unit L4 is moved to the object side to increase the distance between the fourth lens unit L4 and the third lens unit L3; the fifth lens unit L5 is moved to the object side to increase the distance between the fifth lens unit L5 and the fourth lens unit L4; and the sixth lens unit L6 is moved to the object side to reduce the distance between the sixth lens unit L6 and the fifth lens unit L5. The aperture stop SP is moved together with the third lens unit L3. Alternatively, the aperture stop SP may be moved independent of the lens units during zooming.

In embodiment 6 illustrated in FIG. 26, the zoom lens includes, in order from the object side to the image side, the first lens unit L1 having positive refractive power, the second lens unit L2 having negative refractive power, the third lens unit L3 having positive refractive power, and the fourth lens unit L4 having positive refractive power. During zooming, distances between the lens units are varied. More specifically, during zooming from the wide-angle end to the telephoto end, as indicated by arrows, the first lens unit L1 is moved to the object side; the second lens unit L2 is moved to increase the distance between the second lens unit L2 and the first lens unit L1; the third lens unit L3 is moved to the object side to reduce the distance between the third lens unit L3 and the second lens unit L2; and the fourth lens unit L4 is moved to the object side to reduce the distance between the fourth lens unit L4 and the third lens unit L3. The aperture stop SP is moved together with the third lens unit L3. Alternatively, the aperture stop SP may be moved independent of the lens units during zooming.

In each embodiment, focusing is performed by moving the second lens unit L2 along the optical axis. Alternatively, focusing may be performed by moving the entire zoom lens or any one of the lens units.

As described above, in each embodiment, the lens unit IS in the rear lens group Lr is movable in a direction having a component substantially perpendicular to the optical axis so as to displace an image in a direction substantially perpendicular to the optical axis. Thus, image blur caused by vibration of the entire zoom lens can be corrected.

Figure 1:
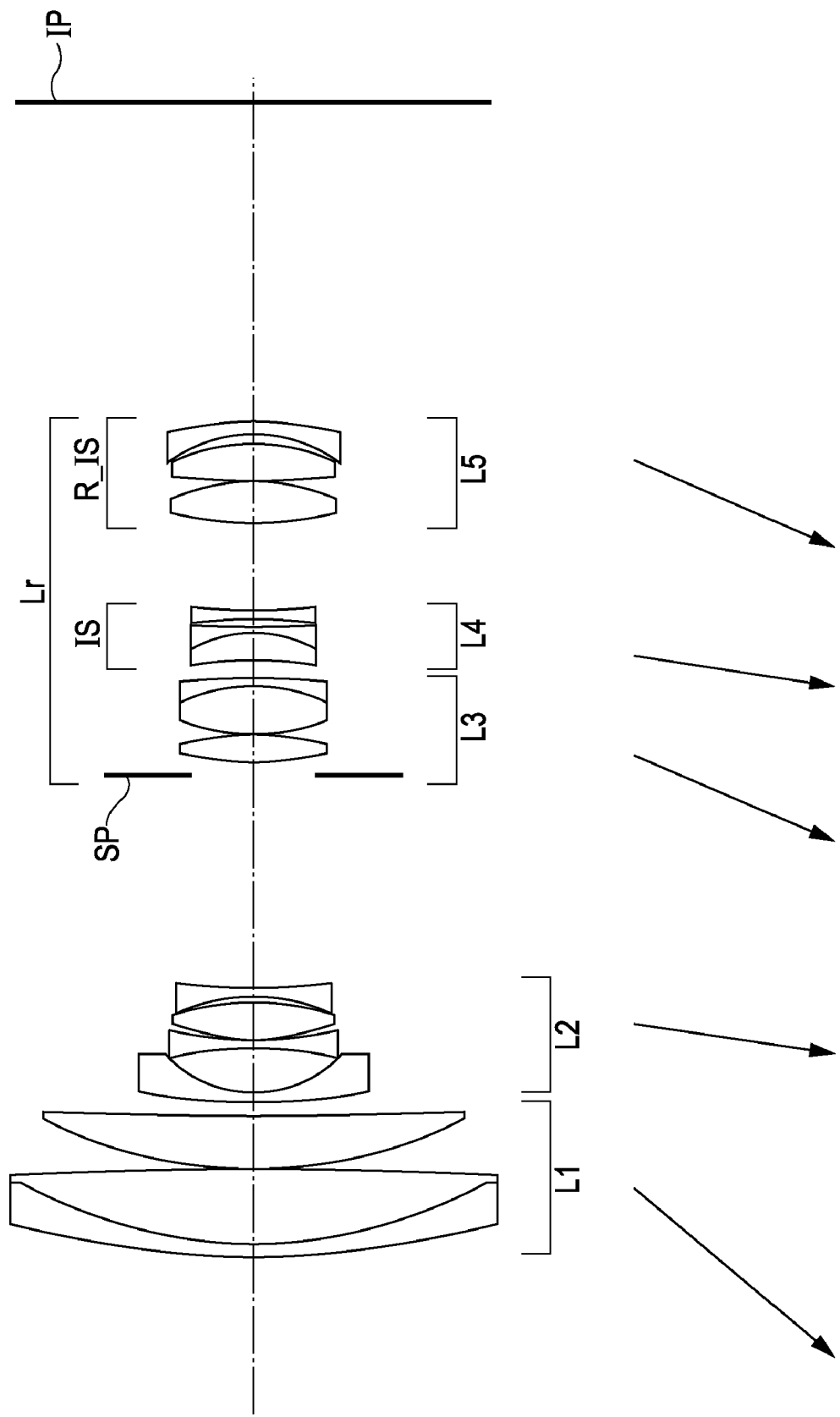
FIG. 1 is a cross-sectional view of a zoom lens according to embodiment 1 of the present invention and illustrates a state in which an object at infinity is in focus at the wide-angle end of the zooming range (short focal length end).
Figure 2:
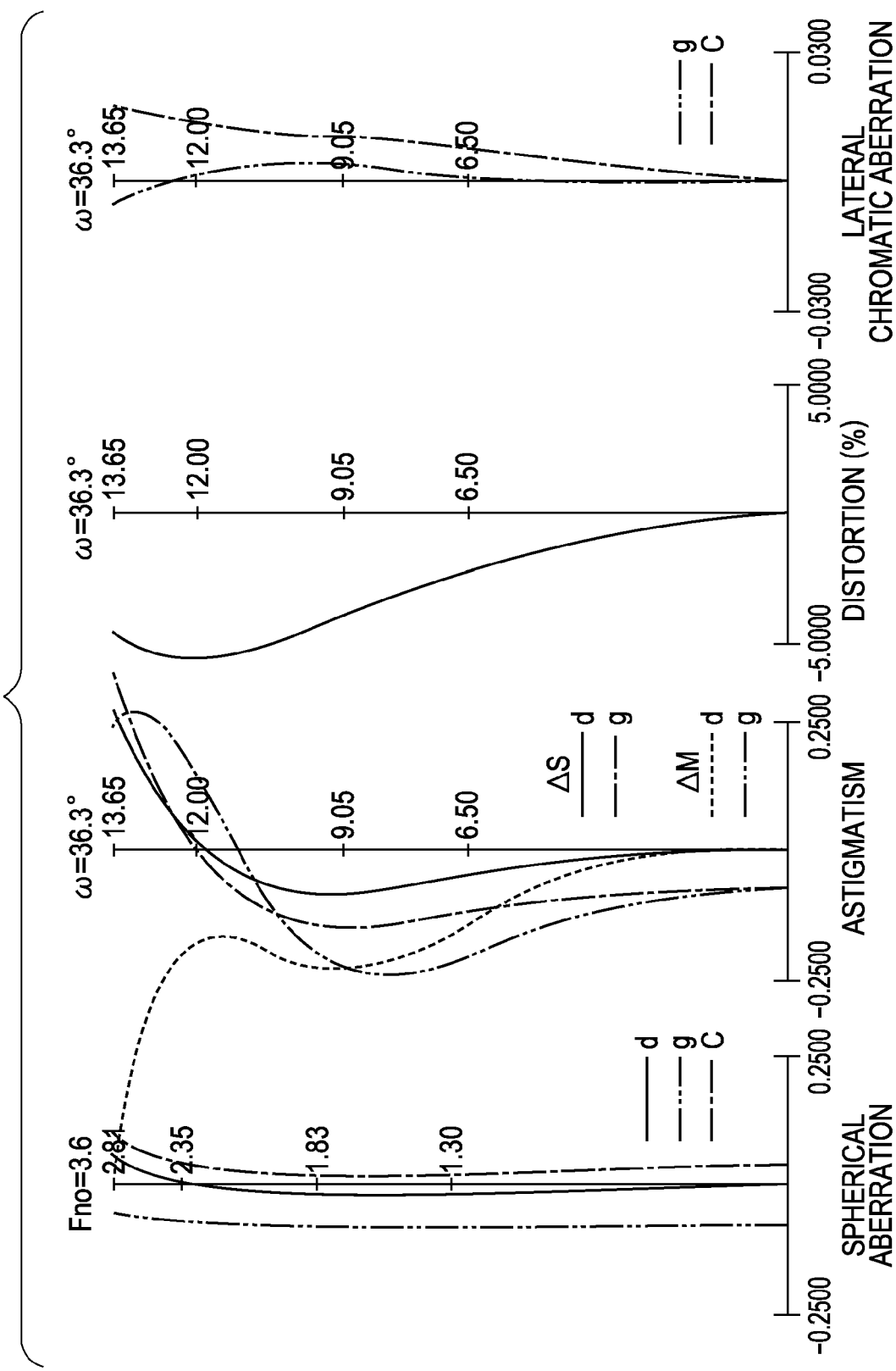
FIG. 2 shows longitudinal aberrations that occur when an object at infinity is in focus at the wide-angle end of the zoom lens of embodiment 1.
Figure 3:
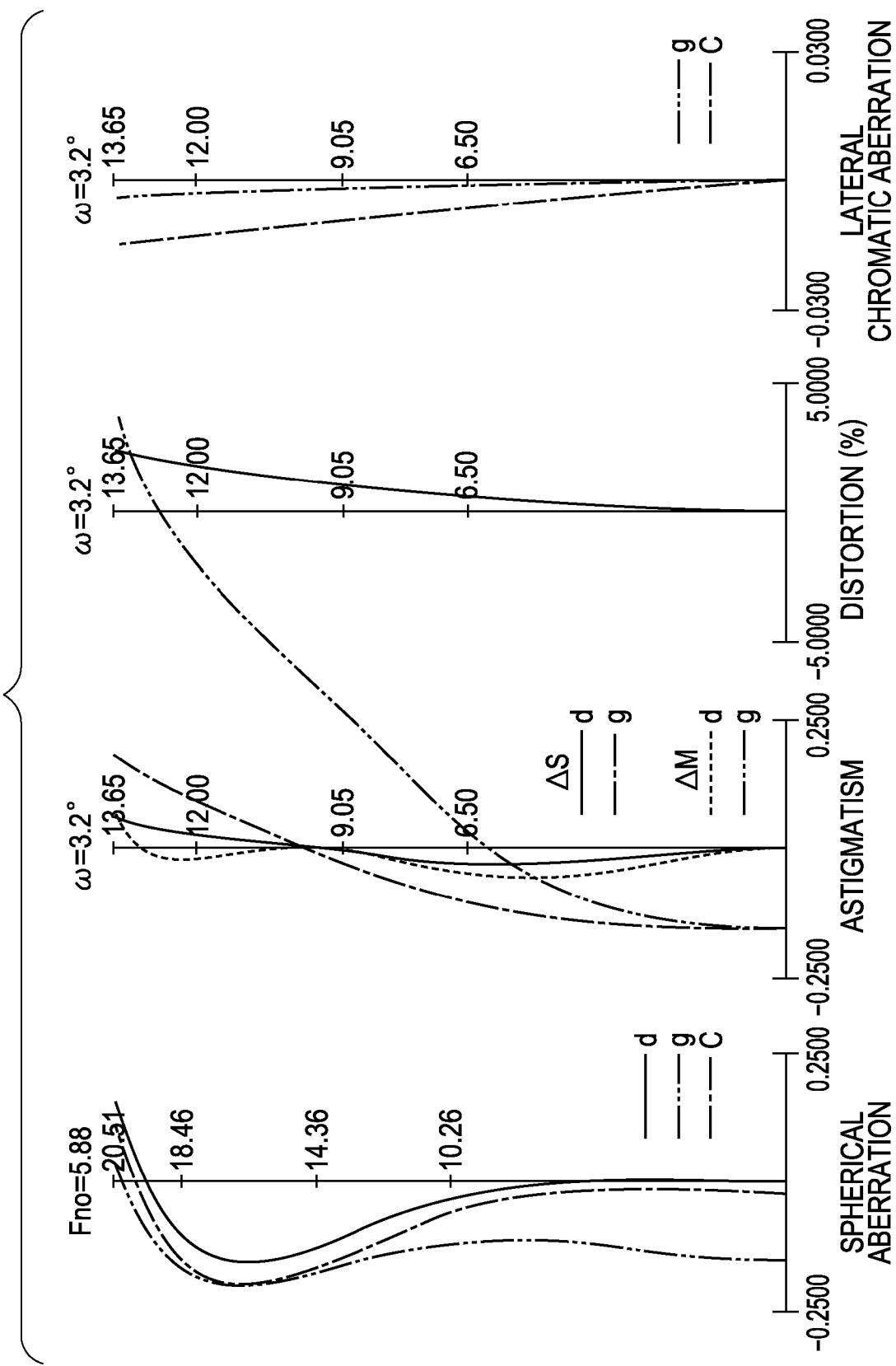
FIG. 3 shows longitudinal aberrations that occur when an object at infinity is in focus at the telephoto end (long focal length end) of the zoom lens of embodiment 1.
Figure 4:
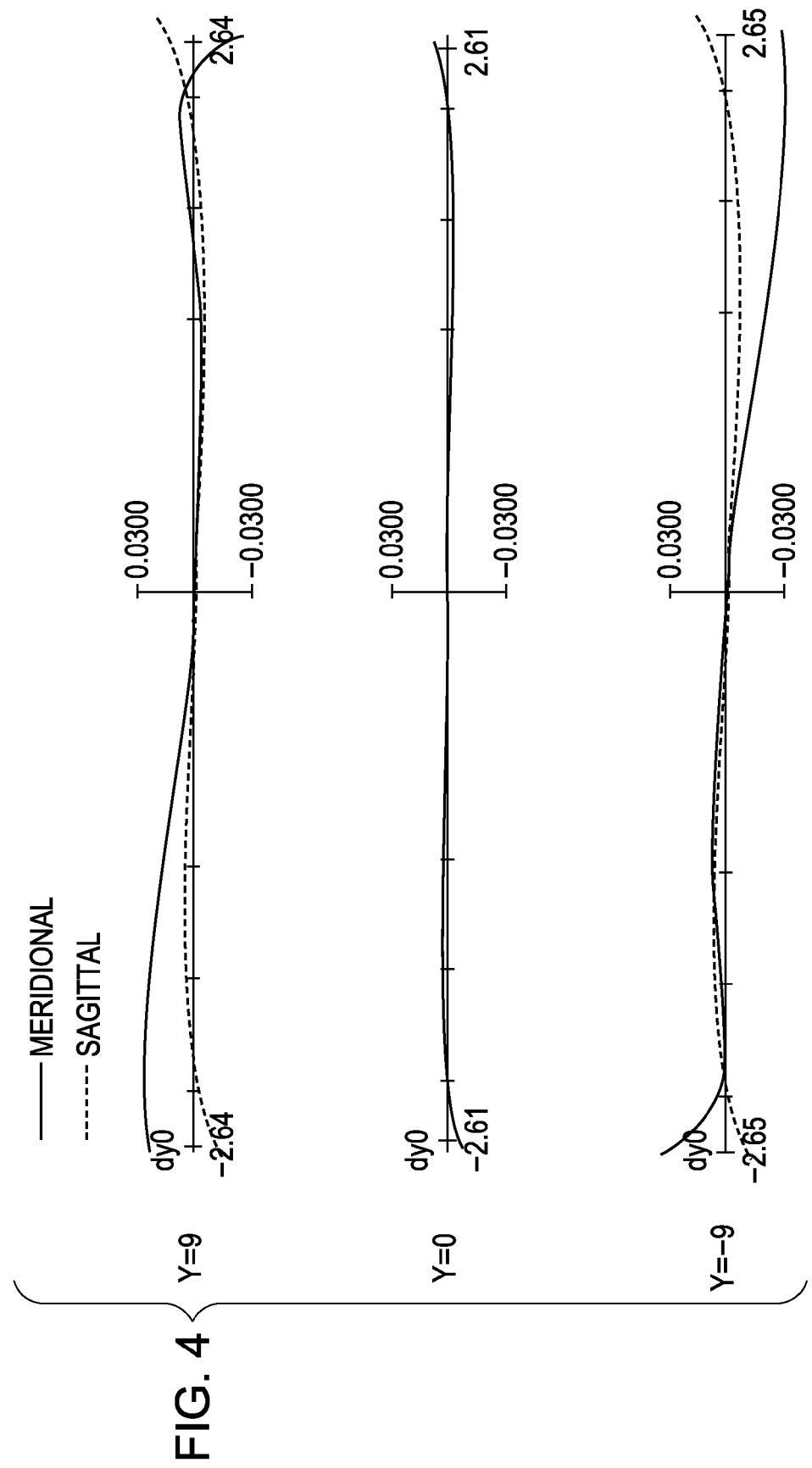
FIG. 4 shows lateral aberrations that occur when an object at infinity is in focus at the wide-angle end of the zoom lens of embodiment 1 and image stabilization is performed with the zoom lens inclined at 0.3°.
Figure 5:
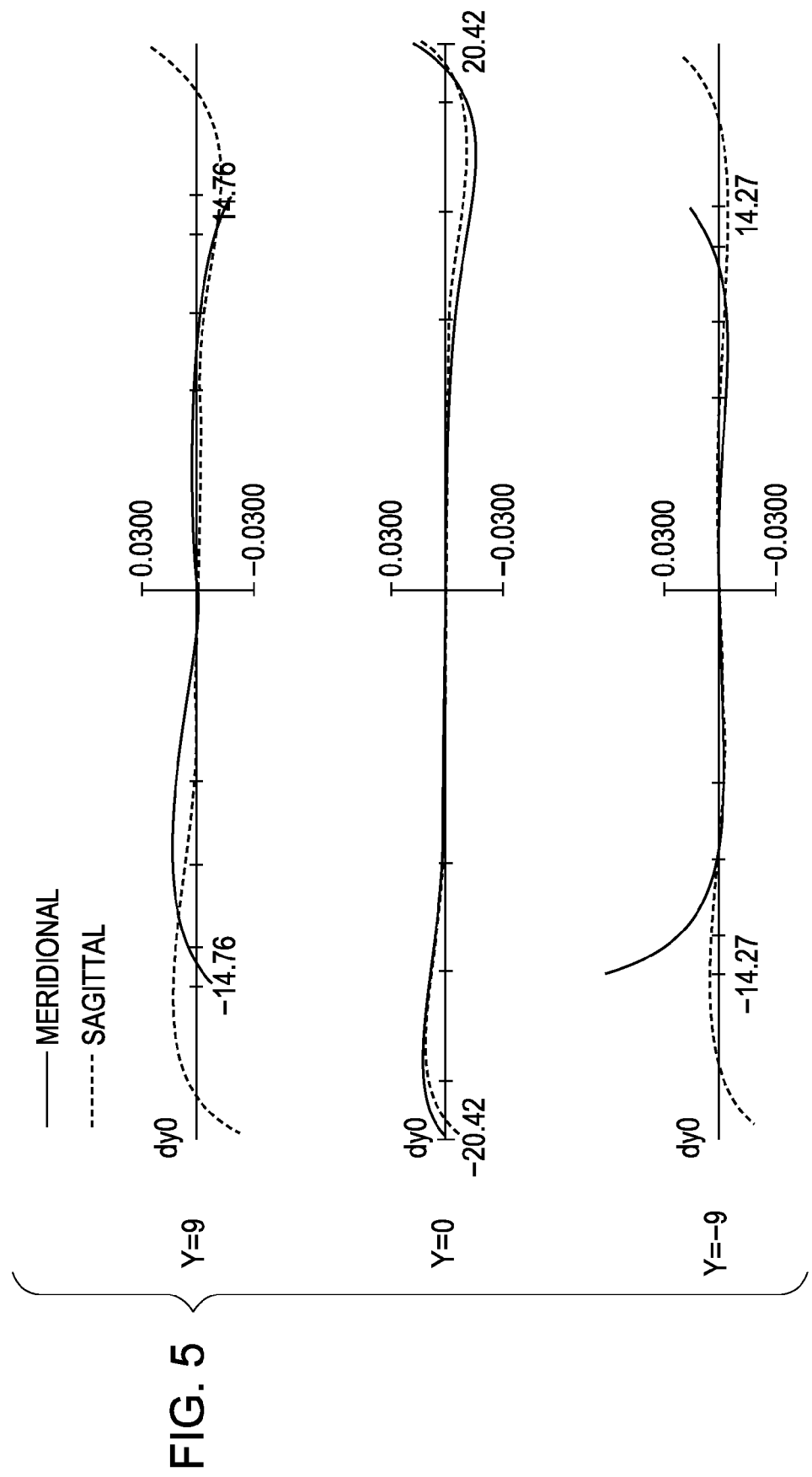
FIG. 5 shows lateral aberrations that occur when an object at infinity is in focus at the telephoto end of the zoom lens of embodiment 1 and image stabilization is performed with the zoom lens inclined at 0.3°.
Figure 11:
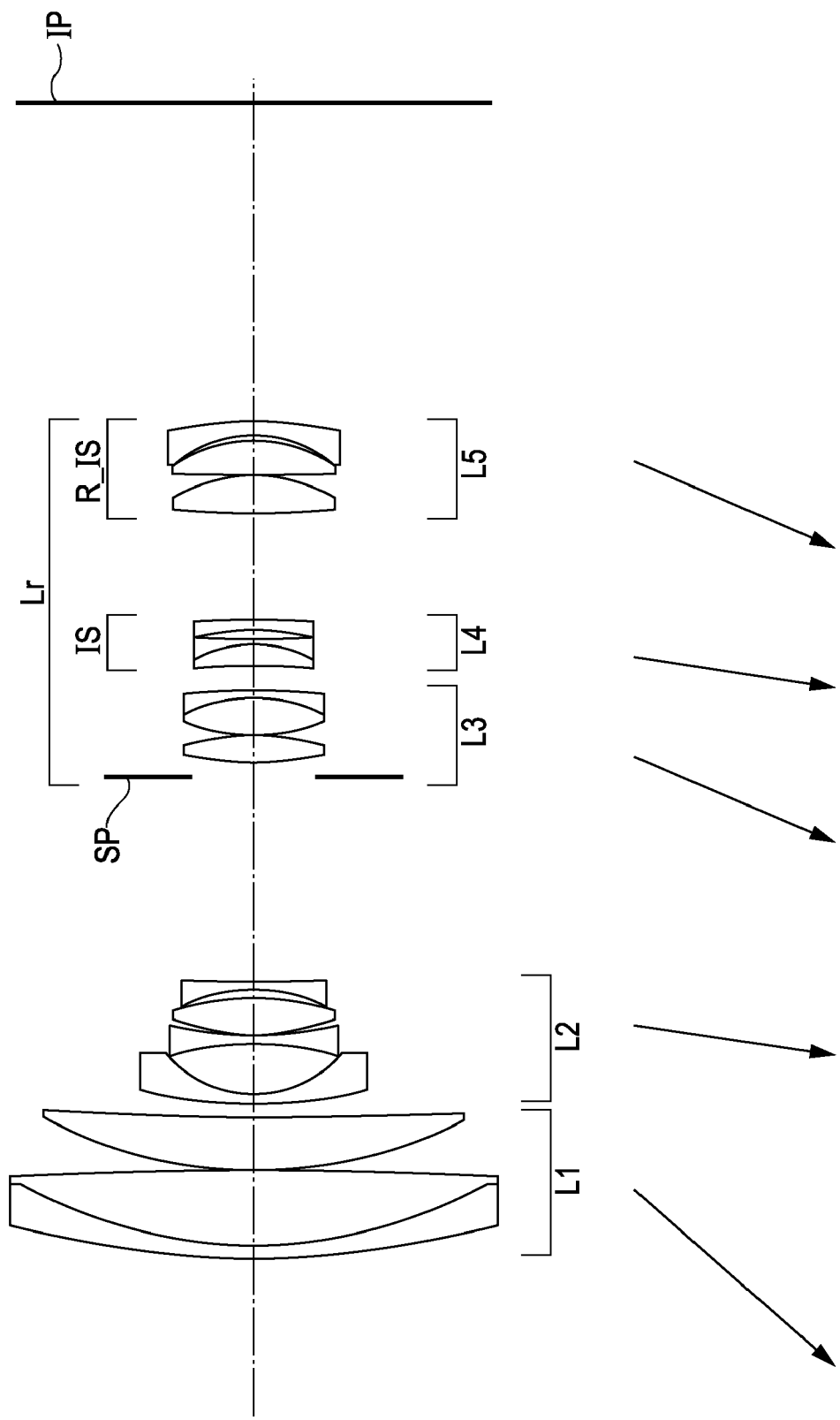
FIG. 11 is a cross-sectional view of a zoom lens according to embodiment 3 of the present invention and illustrates a state in which an object at infinity is in focus at the wide-angle end.
Figure 12:
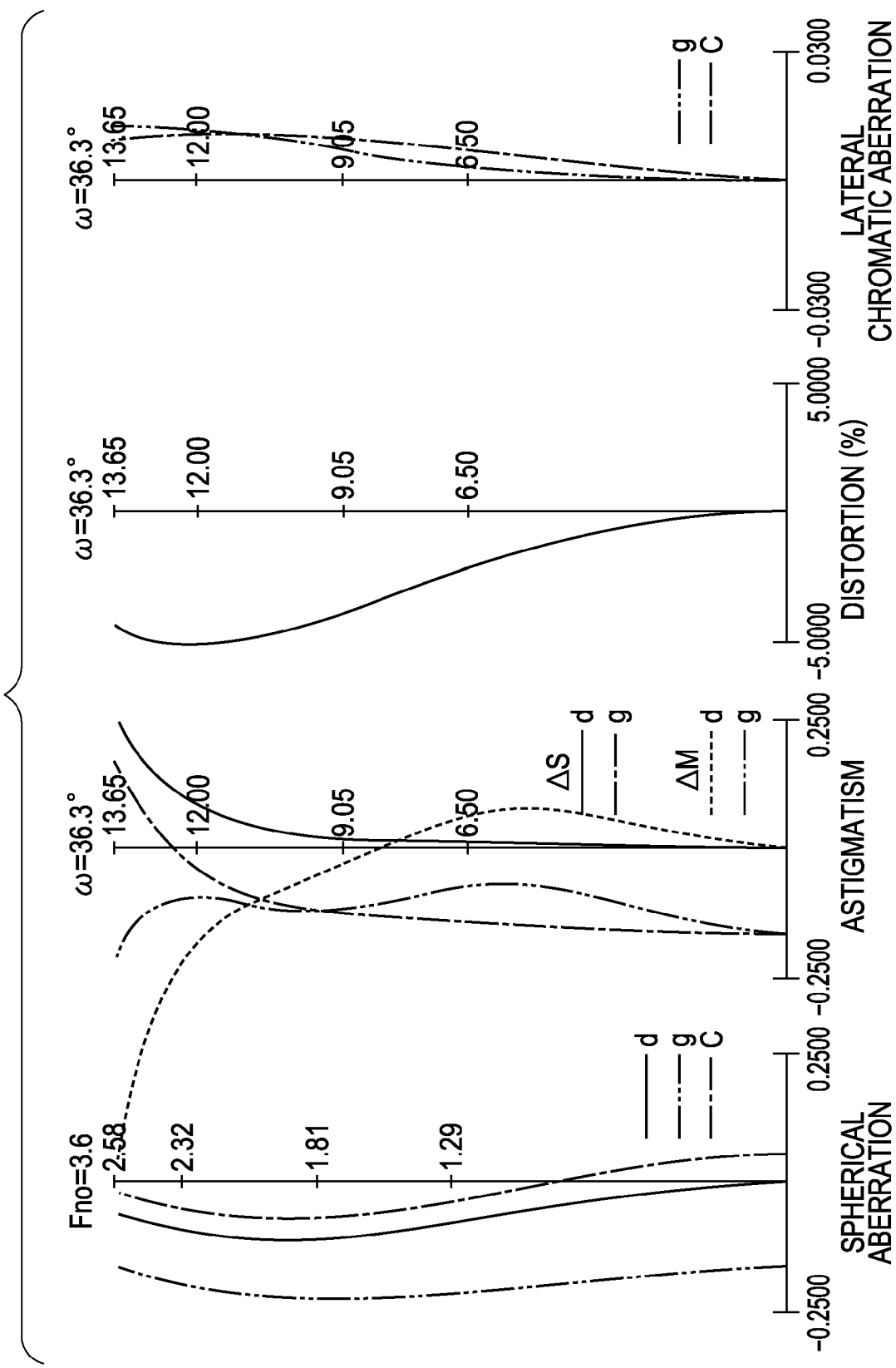
FIG. 12 shows longitudinal aberrations that occur when an object at infinity is in focus at the wide-angle end of the zoom lens of embodiment 3.
Figure 13:
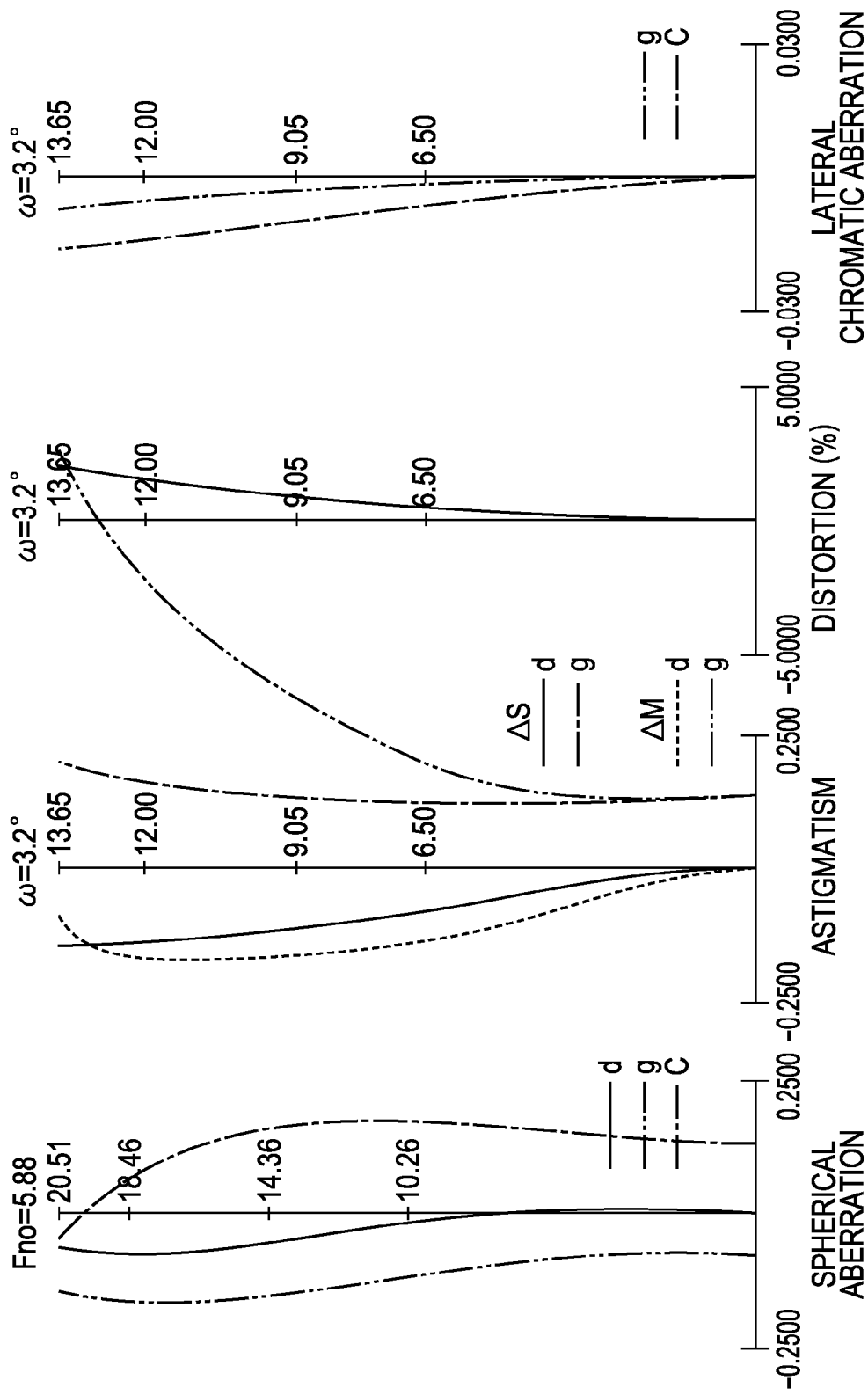
FIG. 13 shows longitudinal aberrations that occur when an object at infinity is in focus at the telephoto end of the zoom lens of embodiment 3.
Figure 14:
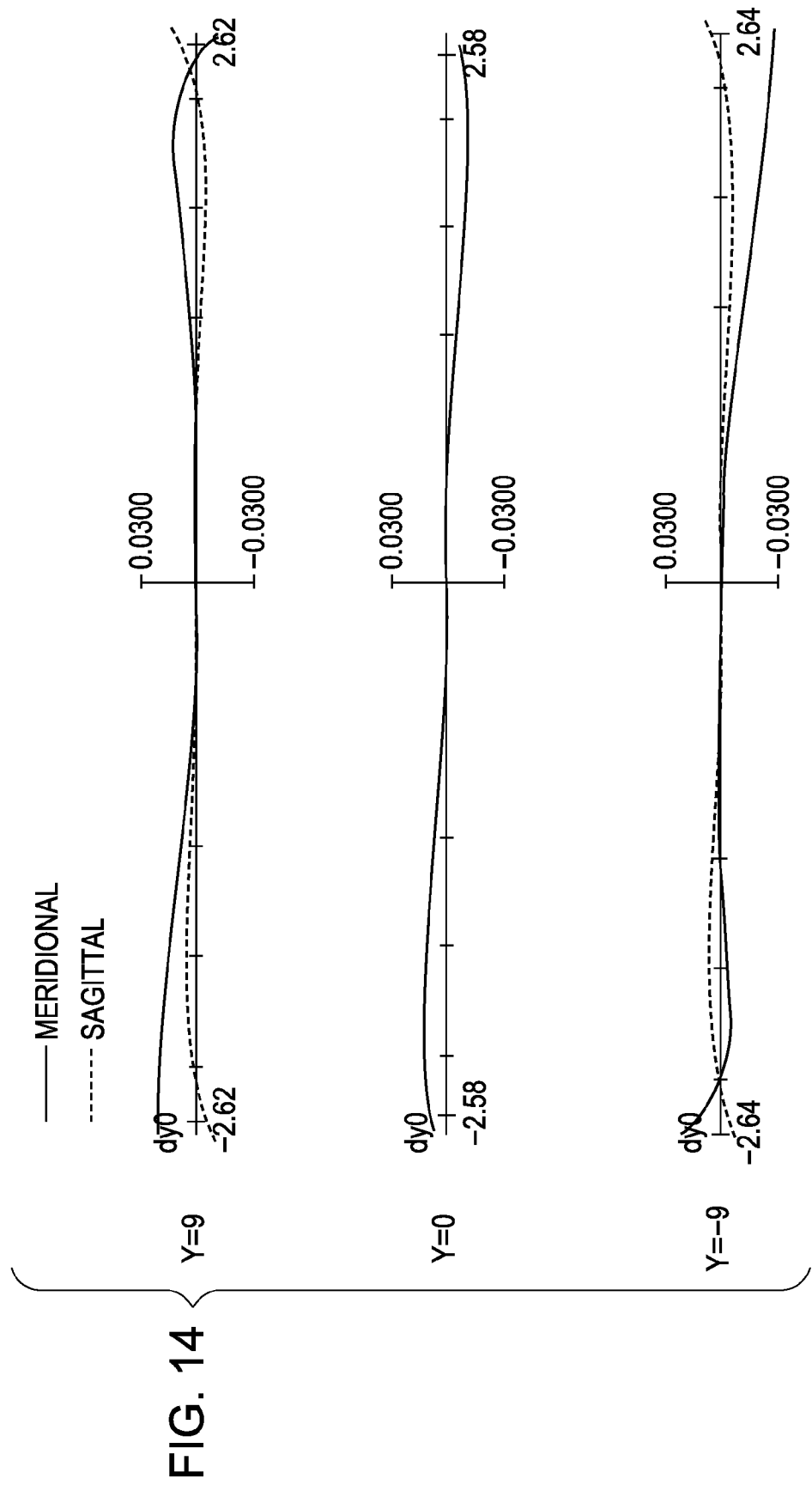
FIG. 14 shows lateral aberrations that occur when an object at infinity is in focus at the wide-angle end of the zoom lens of embodiment 3 and image stabilization is performed with the zoom lens inclined at 0.3°.
Figure 15:
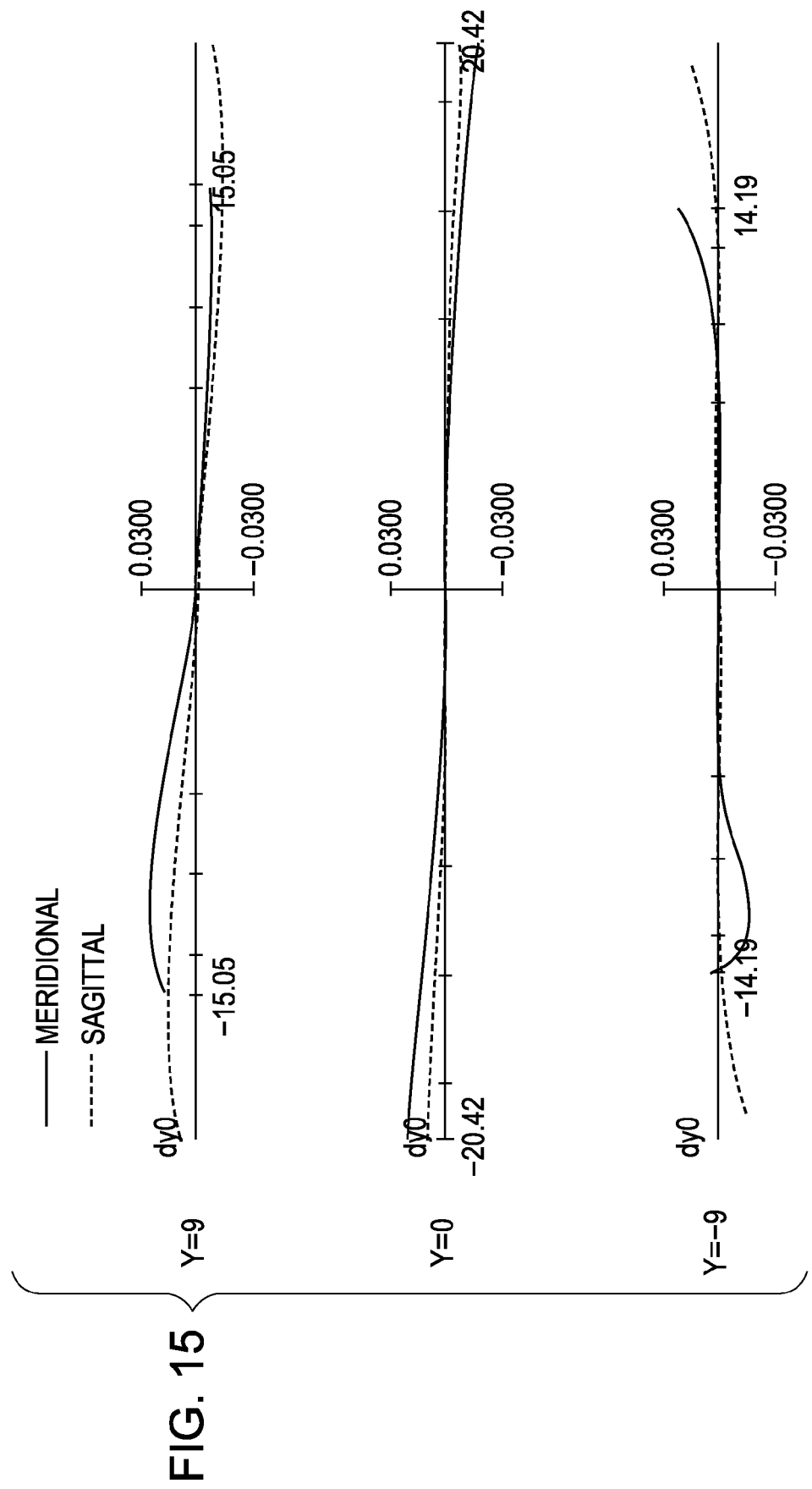
FIG. 15 shows lateral aberrations that occur when an object at infinity is in focus at the telephoto end of the zoom lens of embodiment 3 and image stabilization is performed with the zoom lens inclined at 0.3°.
Figure 16:
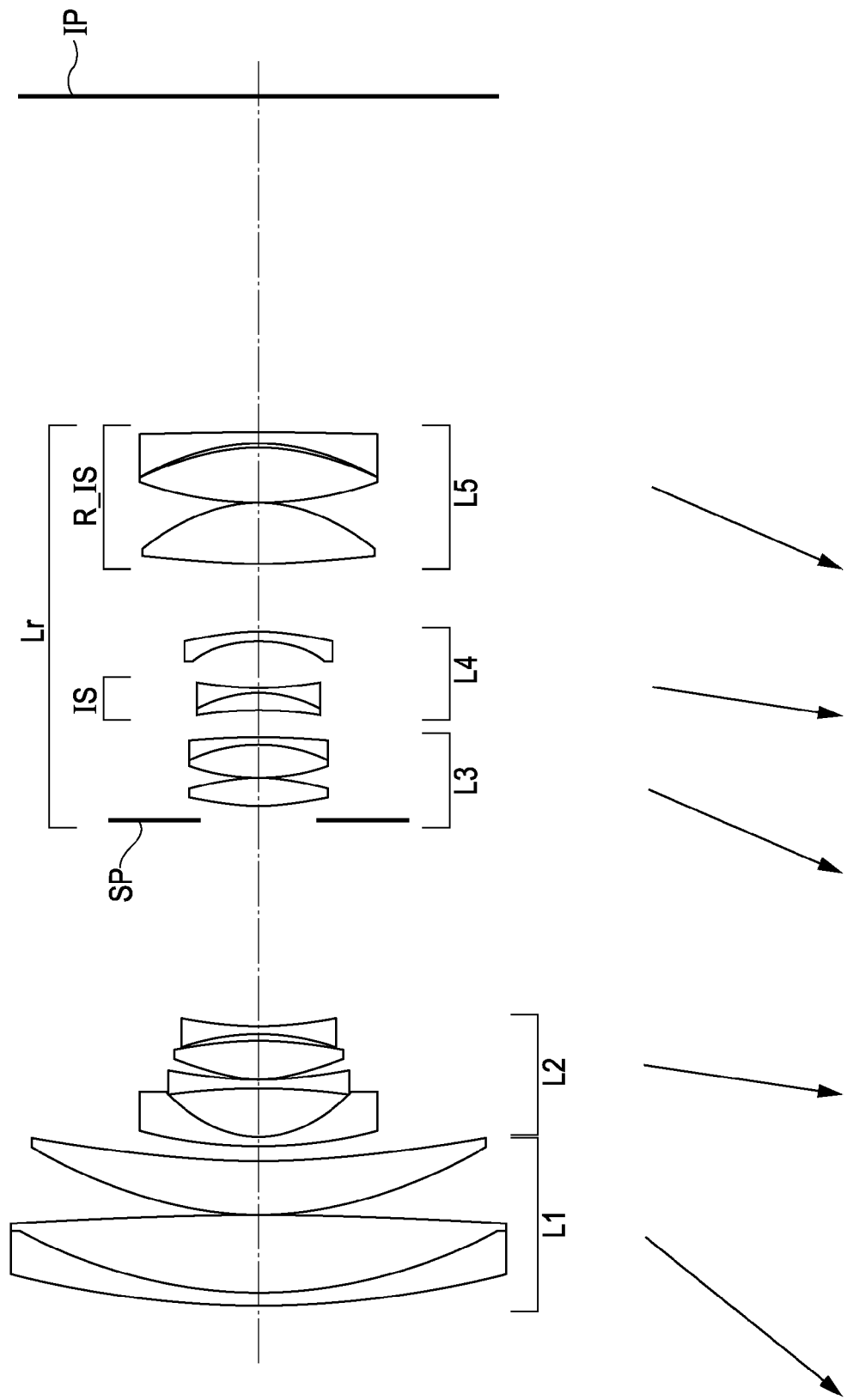
FIG. 16 is a cross-sectional view of a zoom lens according to embodiment 4 of the present invention and illustrates a state in which an object at infinity is in focus at the wide-angle end.
Figure 17:
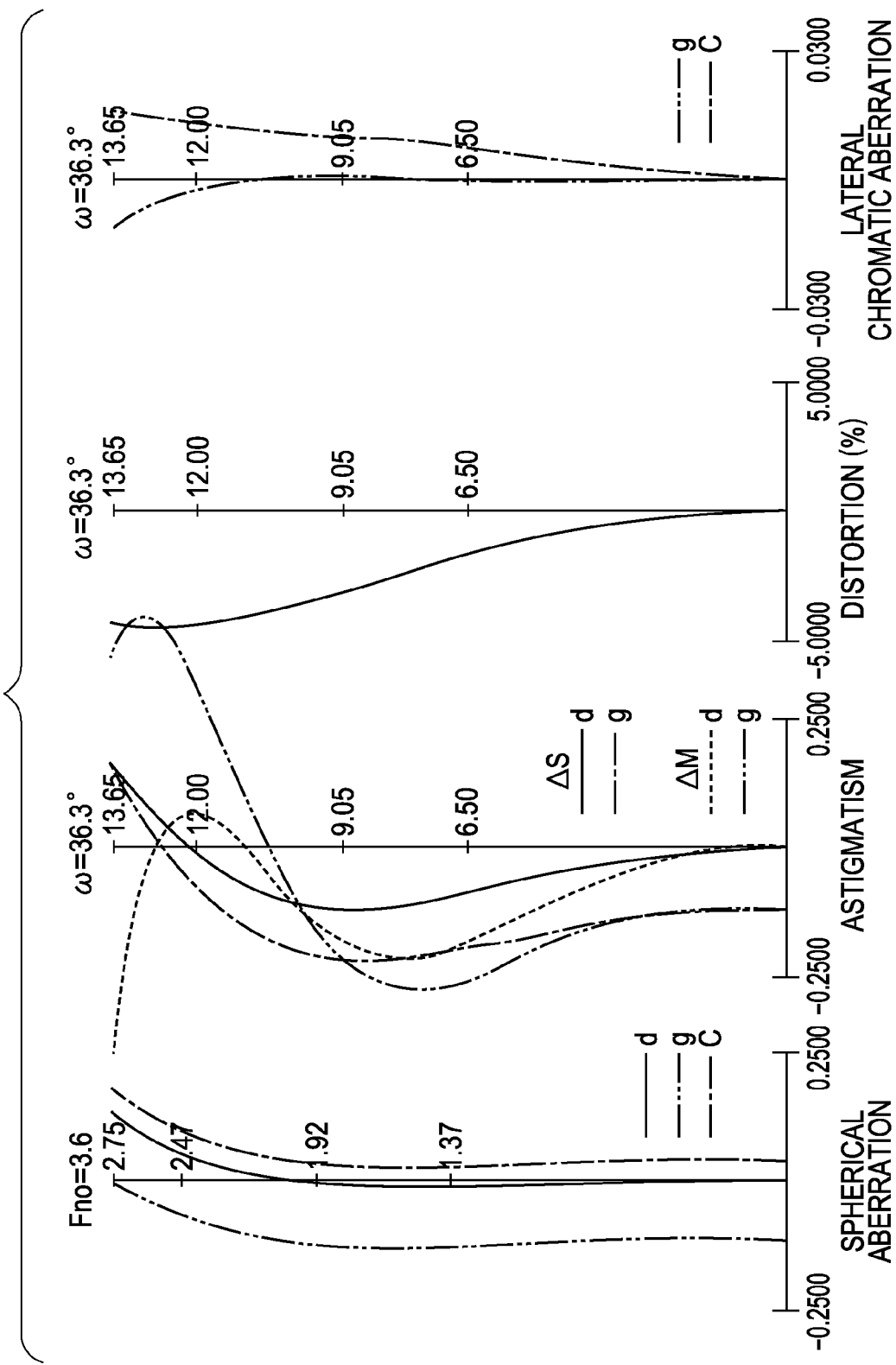
FIG. 17 shows longitudinal aberrations that occur when an object at infinity is in focus at the wide-angle end of the zoom lens of embodiment 4.
Figure 18:
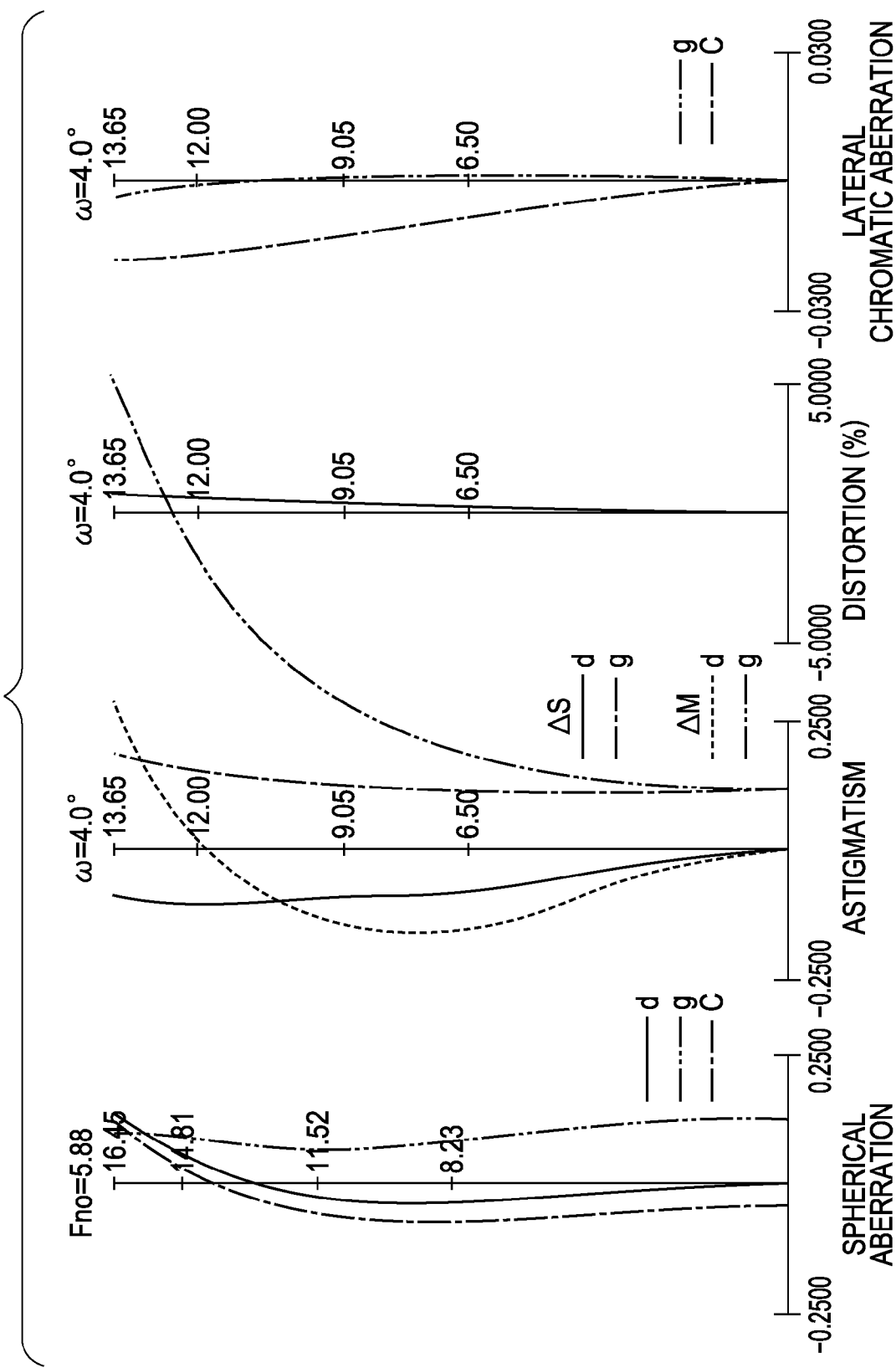
FIG. 18 shows longitudinal aberrations that occur when an object at infinity is in focus at the telephoto end of the zoom lens of embodiment 4.
Figure 19:
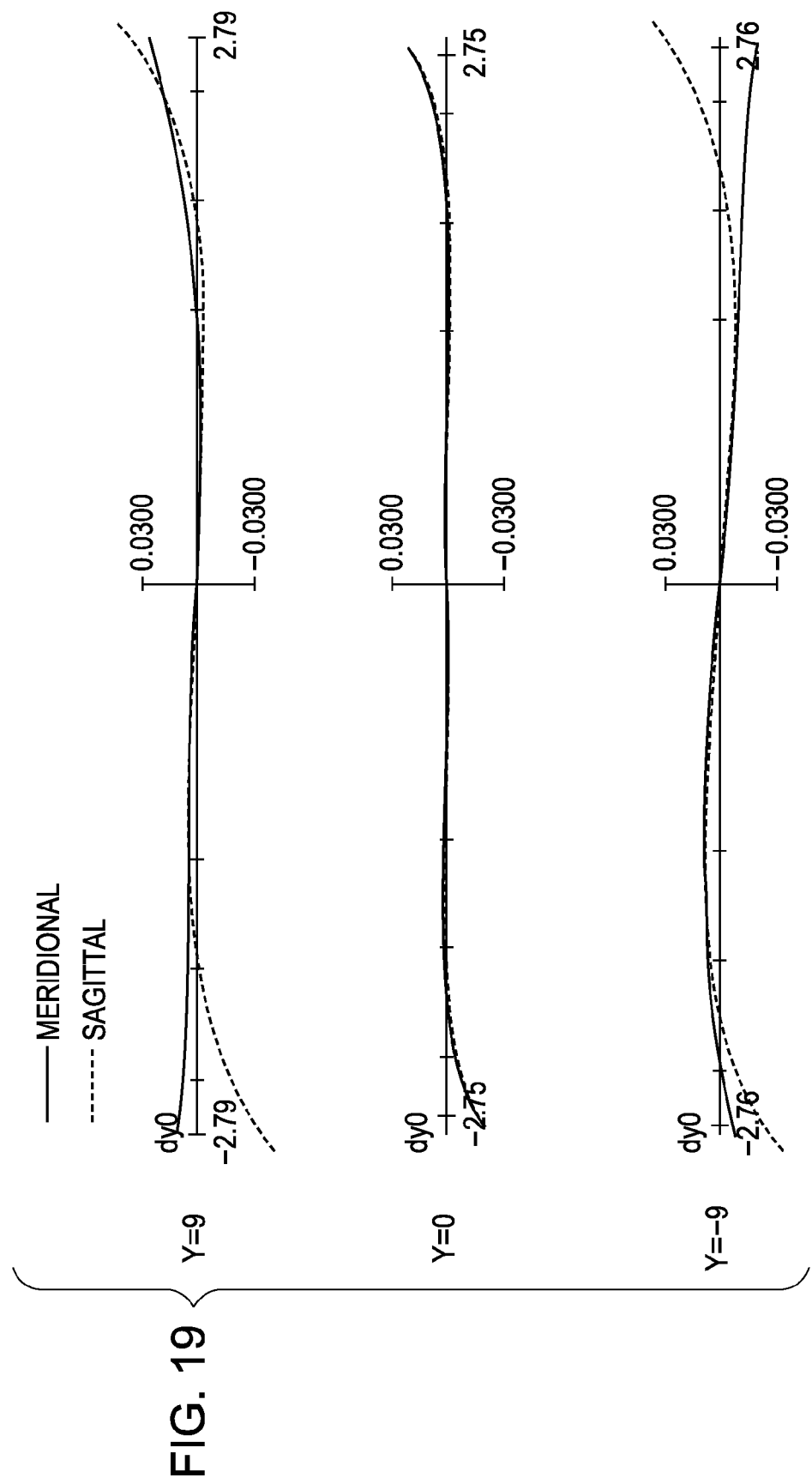
FIG. 19 shows lateral aberrations that occur when an object at infinity is in focus at the wide-angle end of the zoom lens of embodiment 4 and image stabilization is performed with the zoom lens inclined at 0.3°.
Figure 20:
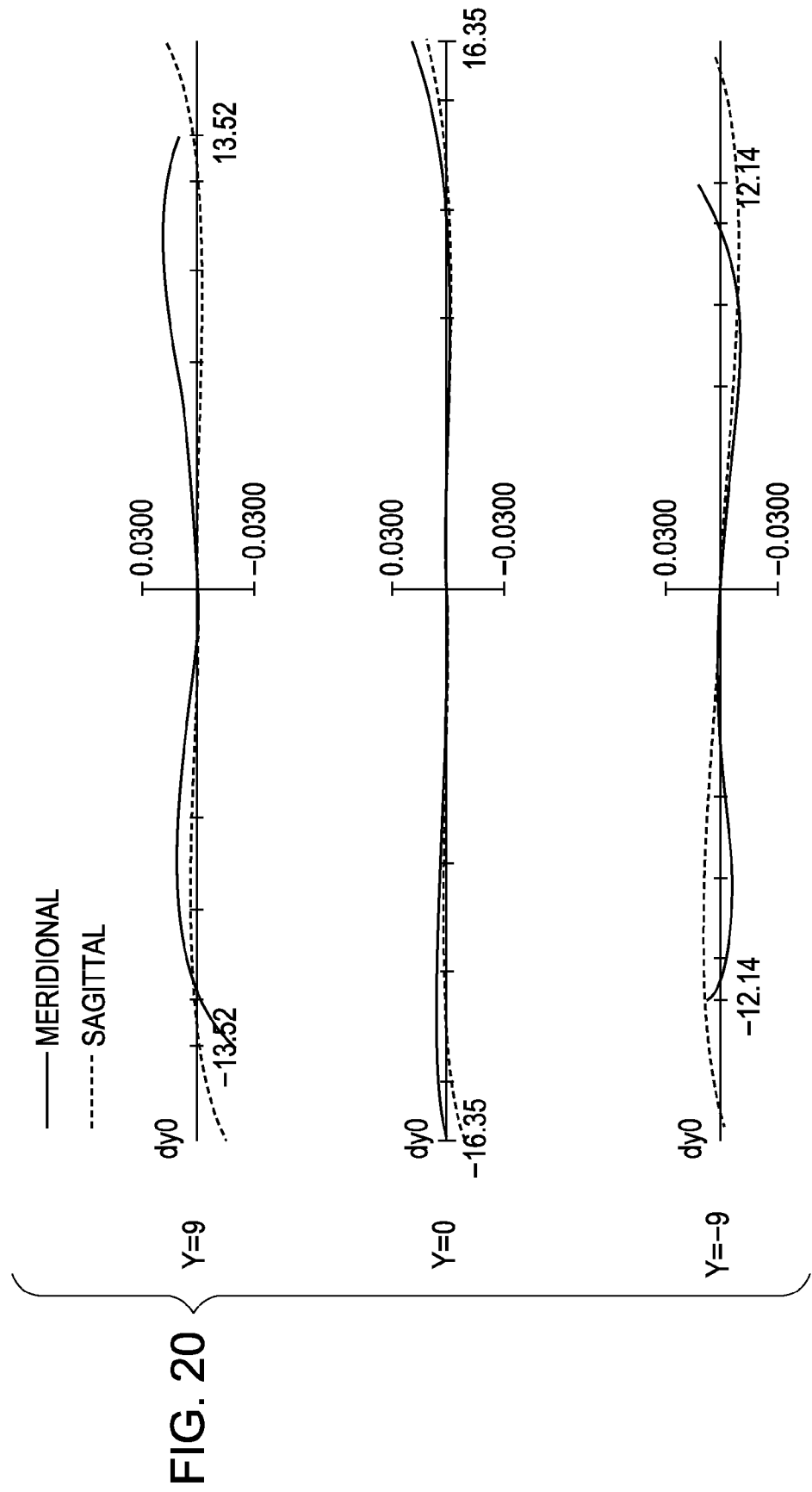
FIG. 20 shows lateral aberrations that occur when an object at infinity is in focus at the telephoto end of the zoom lens of embodiment 4 and image stabilization is performed with the zoom lens inclined at 0.3°.
Figure 21:
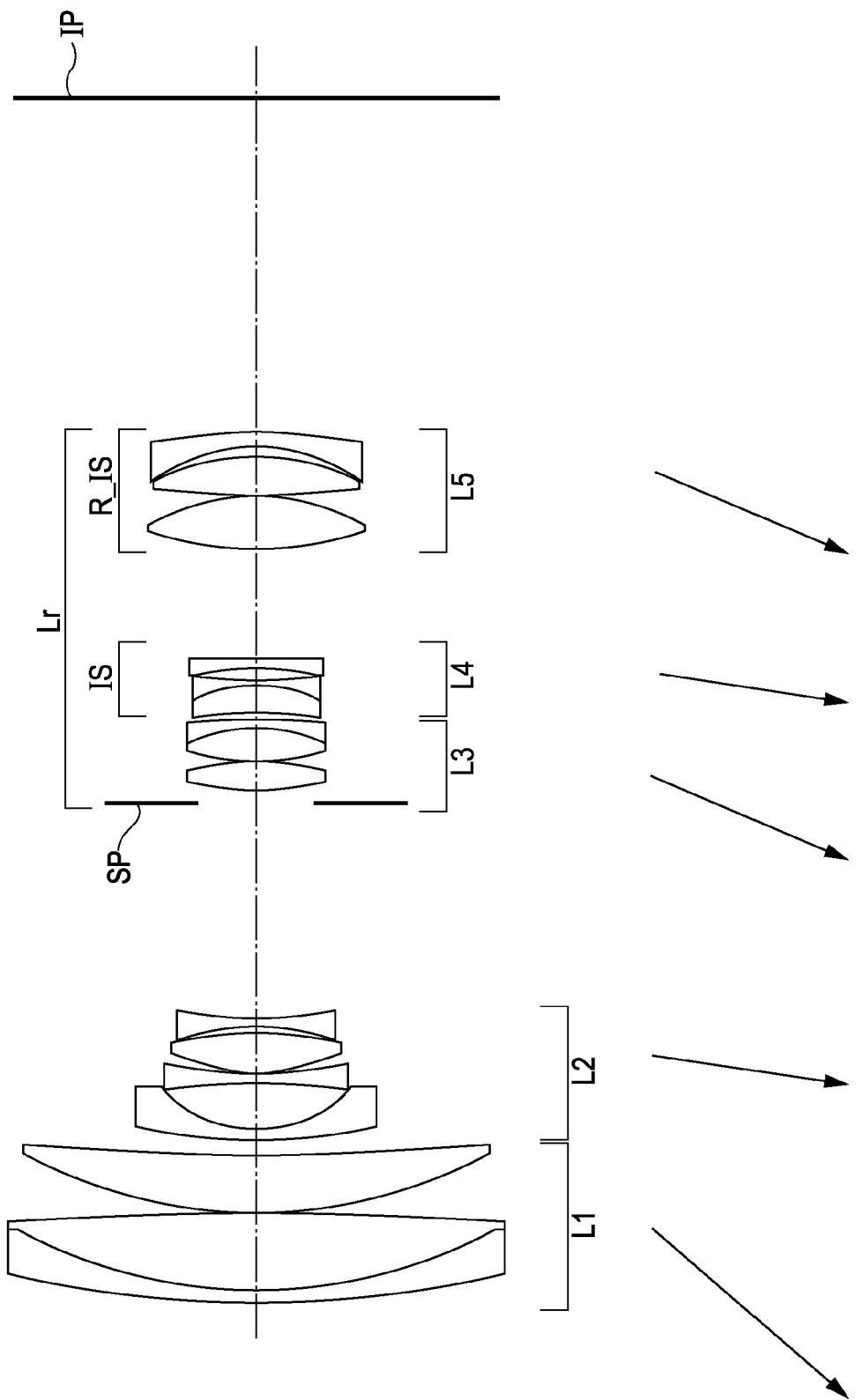
FIG. 21 is a cross-sectional view of a zoom lens according to embodiment 5 of the present invention and illustrates a state in which an object at infinity is in focus at the wide-angle end.
Figure 22:
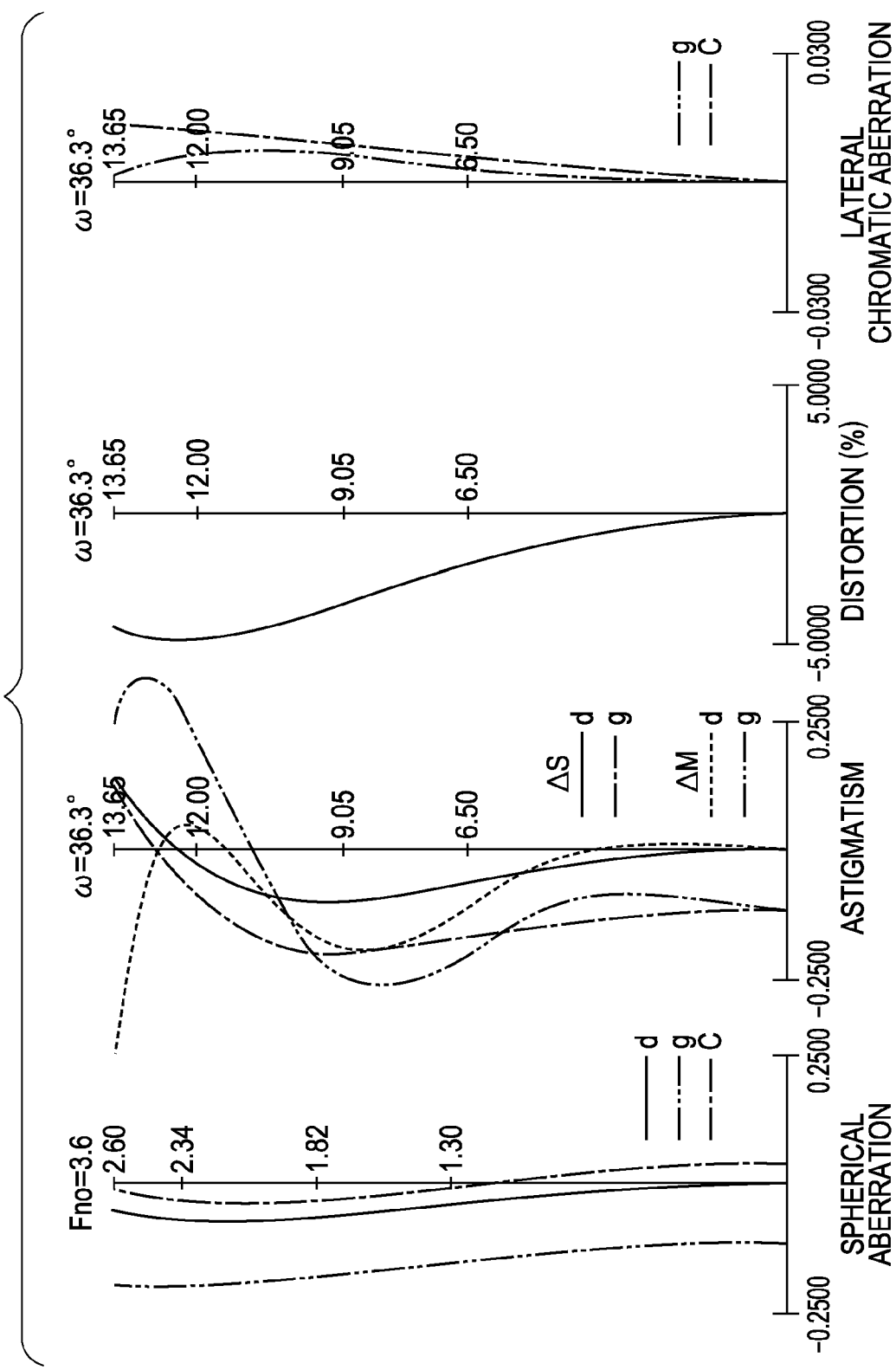
FIG. 22 shows longitudinal aberrations that occur when an object at infinity is in focus at the wide-angle end of the zoom lens of embodiment 5.
Figure 23:
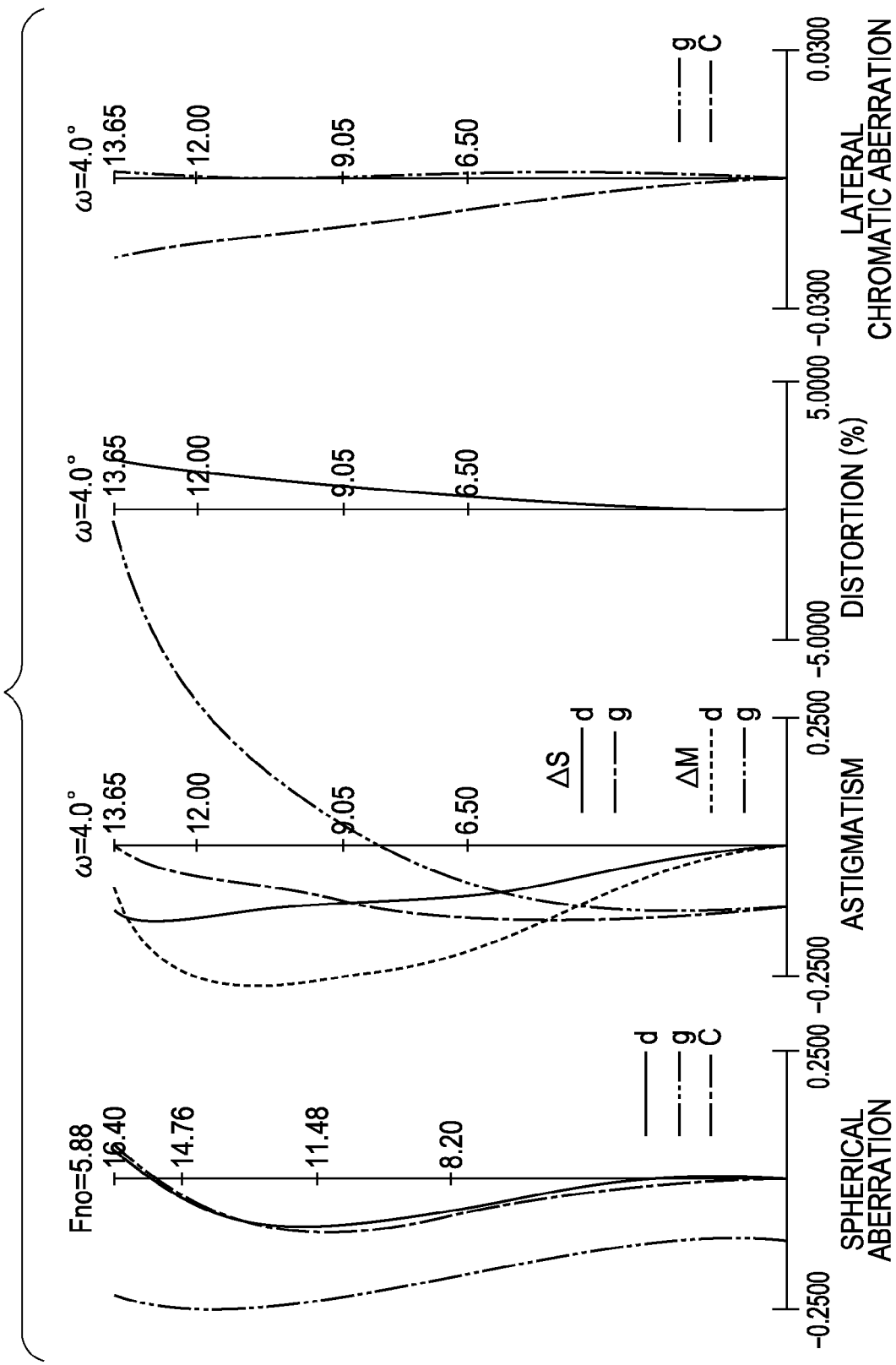
FIG. 23 shows longitudinal aberrations that occur when an object at infinity is in focus at the telephoto end of the zoom lens of embodiment 5.
Figure 24:
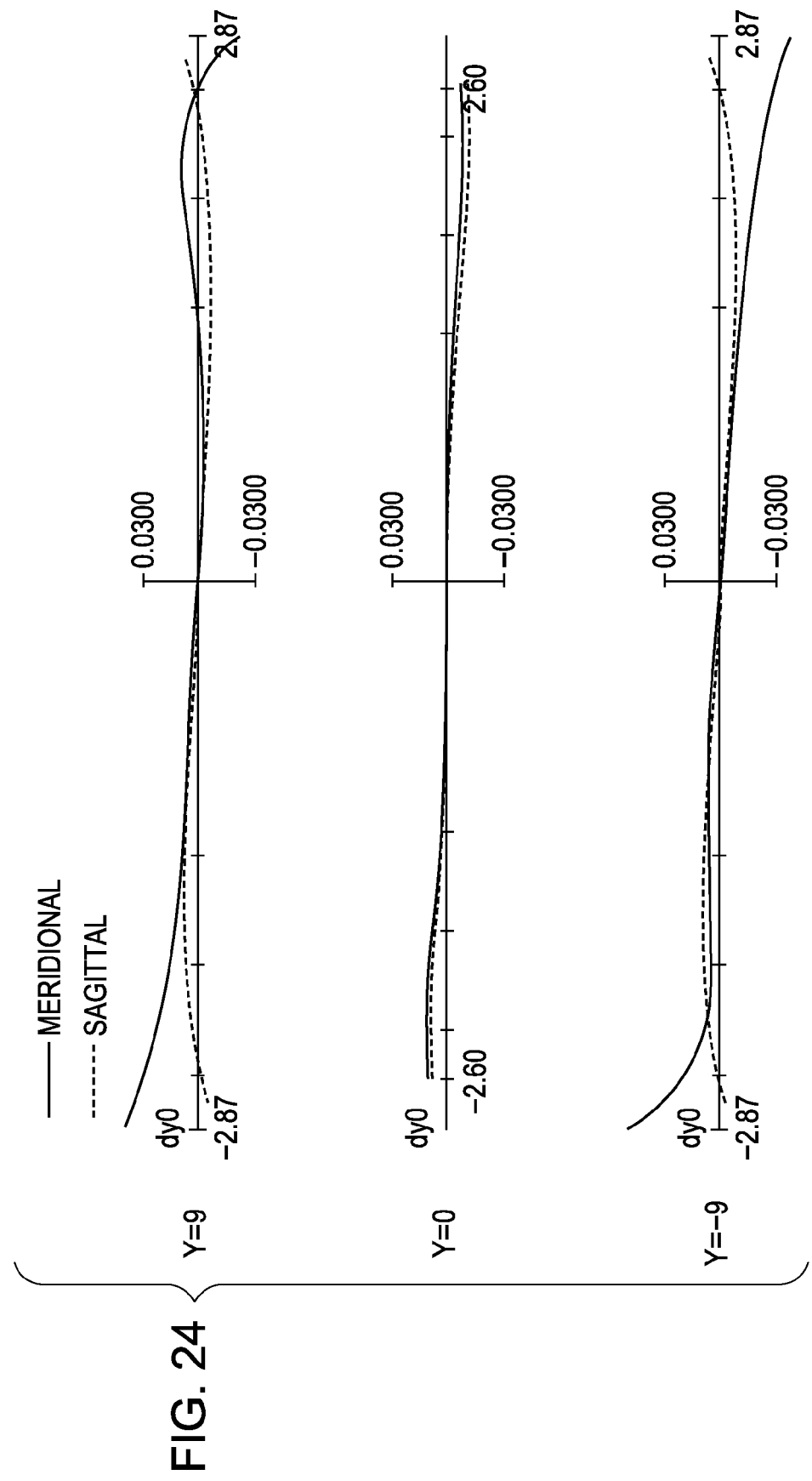
FIG. 24 shows lateral aberrations that occur when an object at infinity is in focus at the wide-angle end of the zoom lens of embodiment 5 and image stabilization is performed with the zoom lens inclined at 0.3°.
Figure 25:
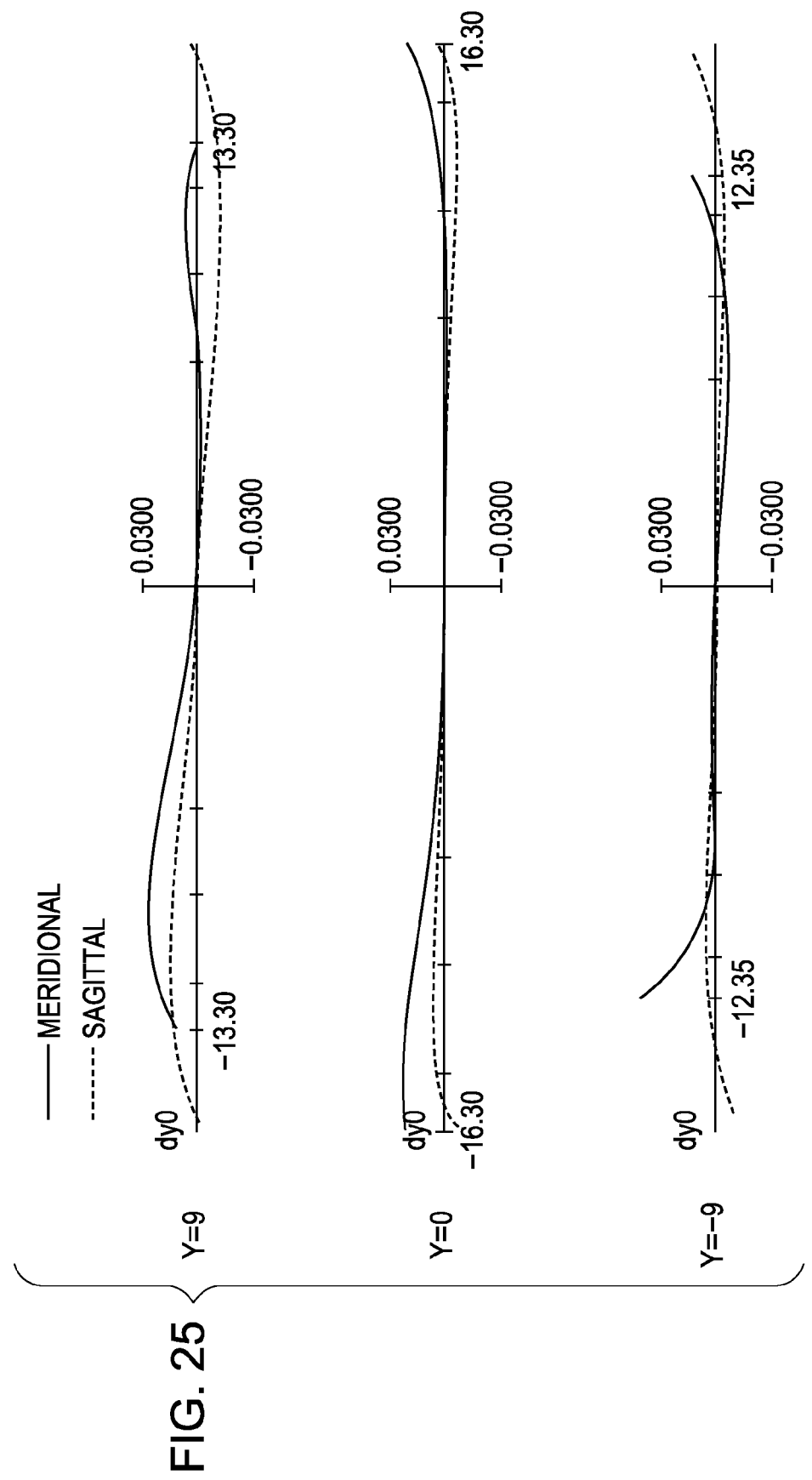
FIG. 25 shows lateral aberrations that occur when an object at infinity is in focus at the telephoto end of the zoom lens of embodiment 5 and image stabilization is performed with the zoom lens inclined at 0.3°.

In embodiments 1, 3, and 5 illustrated in FIGS. 1, 11, and 21, respectively, the lens unit IS corresponds to the fourth lens unit L4. In embodiment 2 illustrated in FIG. 6, the lens unit IS corresponds to the fifth lens unit L5. In embodiment 4 illustrated in FIG. 16, the lens unit IS corresponds to a lens unit having negative refractive power and constituting part of the fourth lens unit L4. In embodiment 6 illustrated in FIG. 26, the lens unit IS corresponds to a lens unit having negative refractive power and constituting part of the third lens unit L3.

In embodiments 1, 3, 4, and 5 illustrated in FIGS. 1, 11, 16, and 21, respectively, the lens unit R_IS that is movable during zooming and is located on the image side of the lens unit IS for image stabilization corresponds to the fifth lens unit L5. In embodiment 2 illustrated in FIG. 6, the lens unit R_IS corresponds to the sixth lens unit L6. In embodiment 6 illustrated in FIG. 26, the lens unit R_IS corresponds to the fourth lens unit L4.

In each embodiment, an additional lens unit having small refractive power may be provided on the object side of the first lens unit L1 or on the image side of the lens unit closest to the image side. Also, a teleconverter lens or a wide converter lens may be provided on the object side or image side.

In each embodiment, the following conditions are satisfied:

$$0.05 < |fIS/fT| < 0.18 \quad (1)$$

$$2.0 < f1/fR\_IS < 4.5 \quad (2)$$

where fIS is the focal length of the lens unit IS, fT is the focal length of the entire zoom lens at the telephoto end, f1 is the focal length of the first lens unit L1, and fR_IS is the focal length of the lens unit R_IS.

For a zoom lens having an image stabilizing function, it is important to maintain good optical performance during image stabilization while ensuring a high level of vibration control sensitivity.

Condition (1) defines the focal length of the lens unit IS for image stabilization. If the upper limit of condition (1) is exceeded, it is difficult to maintain a high level of vibration control sensitivity of the lens unit IS for image stabilization, and the amount of movement of the lens unit IS during image stabilization increases. This causes an increase in the size of a driving mechanism for image stabilization. On the other hand, if the lower limit of condition (1) is not reached, it is difficult to correct coma aberration caused by eccentricity and generated during image stabilization.

Condition (2) needs to be satisfied to ensure a high zoom ratio and a long back focus. Condition (2) defines the ratio of the focal length of the first lens unit L1 to that of the movable lens unit R_IS having positive refractive power. The lens unit R_IS is located on the image side of the lens unit IS and moved for zooming. If the upper limit of condition (2) is exceeded, the focal length of the first lens unit L1 is too long. This causes an increase in the overall length and diameter of the zoom lens. Such a size increase is disadvantageous for practical use of the zoom lens. On the other hand, if the lower limit of condition (2) is not reached, it is difficult to achieve power distribution of retrofocus type at the wide-angle end and to ensure a back focus at the wide-angle end. Moreover, since the amount of magnification-varying operation to be performed by the lens unit R_IS is reduced, it is difficult to achieve a high zoom ratio. Additionally, since the focal length of the first lens unit L1 is too short, it is difficult to correct longitudinal chromatic aberration and lateral chromatic aberration at the telephoto end.

If conditions (1) and (2) described above are satisfied, it is possible to achieve a compact zoom lens having an image stabilizing function that makes it possible to realize a high-quality image through compensation of vibration. In particular, it is possible to achieve a zoom lens having an image stabilizing function and capable of maintaining good optical performance throughout the entire zoom range while having a zoom ratio of as high as 10 times or more.

In each embodiment, it is preferable that at least one of the following conditions be satisfied:

$$0.01 < |f2/fT| < 0.1 \quad (3)$$

$$0.30 < f1/fT < 0.60 \quad (4)$$

where f2 is the focal length of the second lens unit L2. By satisfying a condition, effects corresponding to the condition can be achieved.

Condition (3) defines the focal length of the second lens unit L2. If the upper limit of condition (3) is exceeded, the amount of movement of the first lens unit L1 for zooming increases. This results in an increase in the overall length of the zoom lens at the telephoto end, or makes it difficult to reduce the size of the entire zoom lens. Additionally, since the focal length of the second lens unit L2 is long, it is difficult to achieve power distribution of retrofocus type at the wide-angle end and to realize a wider-angle zoom lens. On the other hand, if the lower limit of condition (3) is not reached, it may be possible to increase the zoom ratio. However, since a Petzval sum increases in a negative direction, it is difficult to correct astigmatic aberration throughout the entire zoom range.

Condition (4) is provided to reduce variations in aberrations that occur during zooming throughout the entire zoom range, and thus to achieve high optical performance over the entire image area. Condition (4) defines the focal length of the first lens unit L1 that is moved for zooming. If the upper limit of condition (4) is exceeded, the overall length of the zoom lens and the amount of movement of the first lens unit L1 for zooming increase. Therefore, it is difficult to reduce the size of the entire zoom lens. On the other hand, if the lower limit of condition (4) is not reached, it is difficult to correct spherical aberration at the telephoto end.

If at least one of conditions (3) and (4) described above is satisfied, it is easy to realize a zoom lens having an image stabilizing function and capable of maintaining good optical performance throughout the entire zoom range while having a zoom ratio of as high as 10 times or more.

If the numerical ranges defined by conditions (1) through (4) are modified to those shown below, it is possible to more easily achieve both high optical performance during image stabilization and a large amount of correction made by the lens unit IS, and thus is preferable:

$$0.10<|fIS/fT|<0.18 \quad (1a)$$

$$2.0<f1/fR\_IS<4.0 \quad (2a)$$

$$0.04<|f2/fT|<0.09 \quad (3a)$$

$$0.33<f1/fT<0.55 \quad (4a)$$

Upper limits in conditions (1a) through (4a) may be replaced with their corresponding values in conditions (1) through (4). Likewise, lower limits in conditions (1a) through (4a) may be replaced with their corresponding values in conditions (1) through (4).

Next, there will be described numerical examples 1 through 6 corresponding to embodiments 1 through 6, respectively. In each numerical example, i denotes the order of an optical surface from the object side; ri denotes the curvature radius of the i-th surface; di denotes the distance between the i-th surface and the (i+1)-th surface; ndi and vdi denote a refractive index and an Abbe number, respectively, with respect to the d-line; f denotes a focal length; and Fno denotes an F-number.

The heading "Aspheric Surface Data" below is followed by a table showing aspheric surface coefficients obtained when an aspheric surface is expressed as follows:

$$x = \frac{\frac{h^2}{R}}{1+\sqrt{1-(1+k)\left(\frac{h}{R}\right)^2}} + c_4 h^2 + c_6 h^2 + c_8 h^2 + c_{10} h^2 + c_{12} h^2$$

where x is the amount of displacement from a reference surface along the optical axis, h is a height in a direction perpendicular to the optical axis, R is a radius of a quadric surface serving as a base, k is a cone constant, and $c_n$ is an n-order aspheric coefficient. The indication "E-Z" means "$10^{-Z}$".

Additionally, the relationships of conditions 1 through 4 described above and values given in numerical examples 1 through 6 are shown in Table 1.

| | Surface Number (i) | Curvature Radius (ri) | Center Thickness or Distance (di) | Refractive Index (ndi) | Abbe Number (vdi) |
|---|---|---|---|---|---|
| L1 | 1 | 110.60 | 1.40 | 1.834 | 37.16 |
| | 2 | 54.65 | 8.74 | 1.497 | 81.54 |
| | 3 | −427.877 | 0.12 | | |
| | 4 | 53.26 | 6.18 | 1.497 | 81.54 |
| | 5 | 500.68 | Variable | | |
| L2 | 6 | 84.10 | 1.20 | 1.772 | 49.6 |
| | 7 | 13.76 | 5.22 | | |
| | 8 | −41.59 | 1.00 | 1.883 | 40.76 |
| | 9 | 43.52 | 0.15 | | |
| | 10 | 24.37 | 4.23 | 1.847 | 23.93 |
| | 11 | −28.37 | 0.73 | | |
| | 12 | −19.54 | 1.00 | 1.804 | 46.57 |
| | 13 | 100.91 | Variable | | |
| L3 | 14 | Stop | 1.59 | | |
| | 15 | 37.61 | 3.16 | 1.487 | 70.23 |
| | 16 | −31.12 | 0.08 | | |
| | 17 | 22.62 | 5.54 | 1.497 | 81.54 |
| | 18 | −19.48 | 0.90 | 1.805 | 25.42 |
| | 19 | −96.70 | Variable | | |
| L4 | 20 | −58.06 | 3.13 | 1.805 | 25.42 |
| | 21 | −15.03 | 0.80 | 1.713 | 53.87 |
| | 22 | 111.55 | 0.69 | | |
| | 23 | −139.00 | 1.20 | 1.835 | 42.72 |
| | 24 | 63.21 | Variable | | |
| L5 | 25 | 37.04 | 4.96 | 1.487 | 70.23 |
| | 26 | −25.43 | 0.21 | | |
| | 27 | 124.70 | 4.08 | 1.487 | 70.23 |
| | 28 | −24.51 | 1.16 | | |
| | 29 | −15.69 | 1.63 | 1.834 | 37.16 |
| | 30 | −37.57 | Variable | | |

Numerical Example 1
f = 18.6~241.2
Fno = 3.6~5.88

| | Wide-angle End | Midpoint | Telephoto End |
|---|---|---|---|
| f | 18.6 | 51.4 | 241.2 |
| d5 | 1.61 | 26.41 | 58.28 |
| d13 | 24.72 | 13.43 | 1.59 |
| d19 | 2.06 | 4.72 | 7.12 |
| d24 | 10.15 | 7.49 | 5.09 |

-continued

Aspheric Surface Data

| Surface Number | k | $C_4$ | $C_6$ | $C_8$ | $C_{10}$ | $C_{12}$ |
|---|---|---|---|---|---|---|
| 6 | −4.6696E+01 | 1.3172E−05 | 7.6864E−09 | −2.9484E−10 | 1.8707E−12 | −1.4100E−15 |
| 20 | 2.0977E+01 | 1.6903E−05 | 6.6308E−08 | 0.0000E+00 | 0.0000E+00 | 0.0000E+00 |
| 26 | 1.1500E+00 | −5.5194E−07 | −4.1314E−08 | −9.1105E−10 | 1.1605E−11 | −8.2760E−14 |

Numerical Example 2
f = 18.6~241.2
Fno = 3.6~5.88

| | Surface Number (i) | Curvature Radius (ri) | Center Thickness or Distance (di) | Refractive Index (ndi) | Abbe Number (vdi) |
|---|---|---|---|---|---|
| L1 | 1 | 111.64 | 1.40 | 1.834 | 37.16 |
| | 2 | 54.95 | 8.31 | 1.497 | 81.54 |
| | 3 | −452.07 | 0.12 | | |
| | 4 | 51.30 | 5.99 | 1.497 | 81.54 |
| | 5 | 341.22 | Variable | | |
| L2 | 6 | 78.63 | 1.20 | 1.772 | 49.6 |
| | 7 | 13.70 | 5.72 | | |
| | 8 | −39.93 | 1.00 | 1.883 | 40.76 |
| | 9 | 38.69 | 0.15 | | |
| | 10 | 24.28 | 4.31 | 1.847 | 23.93 |
| | 11 | −27.63 | 0.86 | | |
| | 12 | −18.41 | 1.00 | 1.804 | 46.57 |
| | 13 | 290.28 | Variable | | |
| L3 | 14 | Stop | 1.59 | | |
| | 15 | 35.84 | 3.31 | 1.487 | 70.23 |
| | 16 | −26.24 | Variable | | |
| L4 | 17 | 24.78 | 4.31 | 1.497 | 81.54 |
| | 18 | −17.90 | 0.90 | 1.805 | 25.42 |
| | 19 | −90.16 | Variable | | |
| L5 | 20 | −95.34 | 2.94 | 1.805 | 25.42 |
| | 21 | −14.68 | 0.80 | 1.713 | 53.87 |
| | 22 | 239.21 | 0.67 | | |
| | 23 | −48.15 | 1.20 | 1.835 | 42.72 |
| | 24 | 80.42 | Variable | | |
| L6 | 25 | 44.06 | 5.13 | 1.487 | 70.23 |
| | 26 | −21.19 | 0.20 | | |
| | 27 | 129.67 | 3.72 | 1.487 | 70.23 |
| | 28 | −29.90 | 1.13 | | |
| | 29 | −17.06 | 1.63 | 1.834 | 37.16 |
| | 30 | −45.97 | Variable | | |

| | Wide-angle End | Midpoint | Telephoto End |
|---|---|---|---|
| f | 18.6 | 50.9 | 241.2 |
| d5 | 1.71 | 27.19 | 59.22 |
| d13 | 24.63 | 13.03 | 1.48 |
| d16 | 0.01 | 2.04 | 2.61 |
| d19 | 1.94 | 6.16 | 8.51 |
| d24 | 11.83 | 7.62 | 5.26 |

Aspheric Surface Data

| Surface Number | k | $C_4$ | $C_6$ | $C_8$ | $C_{10}$ | $C_{12}$ |
|---|---|---|---|---|---|---|
| 6 | −8.0993E+01 | 2.4719E−05 | −1.0459E−07 | 6.8280E−10 | −2.8156E−12 | 7.2910E−15 |
| 20 | 5.7359E+01 | 9.7457E−06 | 4.0645E−08 | 0.0000E+00 | 0.0000E+00 | 0.0000E+00 |
| 26 | −1.7203E+00 | −2.7024E−05 | −2.4741E−08 | −1.2860E−09 | 1.7637E−11 | −9.3308E−14 |

Numerical Example 3
f = 18.6~241.2
Fno = 3.6~5.88

| | Surface Number (i) | Curvature Radius (ri) | Center Thickness or Distance (di) | Refractive Index (ndi) | Abbe Number (vdi) |
|---|---|---|---|---|---|
| L1 | 1 | 110.18 | 1.40 | 1.834 | 37.16 |
| | 2 | 55.12 | 8.62 | 1.497 | 81.54 |
| | 3 | −538.05 | 0.12 | | |
| | 4 | 52.61 | 6.29 | 1.497 | 81.54 |
| | 5 | 399.03 | Variable | | |

-continued

| | Surface | Curvature Radius | Center Thickness or Distance | Refractive Index | Abbe Number |
|---|---|---|---|---|---|
| L2 | 6 | 64.43 | 1.20 | 1.772 | 49.6 |
| | 7 | 13.60 | 5.48 | | |
| | 8 | −36.76 | 1.00 | 1.883 | 40.76 |
| | 9 | 37.32 | 0.15 | | |
| | 10 | 24.08 | 4.22 | 1.847 | 23.93 |
| | 11 | −30.11 | 1.04 | | |
| | 12 | −18.65 | 1.00 | 1.804 | 46.57 |
| | 13 | 399.51 | Variable | | |
| L3 | 14 | Stop | 1.63 | | |
| | 15 | 41.21 | 3.18 | 1.487 | 70.23 |
| | 16 | −25.79 | 0.12 | | |
| | 17 | 25.18 | 4.26 | 1.497 | 81.54 |
| | 18 | −18.65 | 0.90 | 1.805 | 25.42 |
| | 19 | −80.37 | Variable | | |
| L4 | 20 | −170.55 | 2.53 | 1.805 | 25.42 |
| | 21 | −15.74 | 0.80 | 1.713 | 53.87 |
| | 22 | 59.15 | 0.92 | | |
| | 23 | −36.58 | 1.20 | 1.835 | 42.72 |
| | 24 | −137.60 | Variable | | |
| L5 | 25 | 122.54 | 4.26 | 1.487 | 70.23 |
| | 26 | −21.81 | 0.08 | | |
| | 27 | 152.63 | 4.15 | 1.487 | 70.23 |
| | 28 | −17.46 | 0.43 | | |
| | 29 | −15.33 | 1.63 | 1.834 | 37.16 |
| | 30 | −45.47 | Variable | | |

| | Wide-angle End | Midpoint | Telephoto End |
|---|---|---|---|
| f | 18.6 | 51.4 | 241.2 |
| d5 | 1.71 | 27.81 | 60.30 |
| d13 | 24.05 | 12.54 | 1.53 |
| d19 | 2.83 | 4.62 | 6.67 |
| d24 | 12.46 | 6.35 | 4.34 |

Aspheric Surface Data

| Surface Number | k | $C_4$ | $C_6$ | $C_8$ | $C_{10}$ | $C_{12}$ |
|---|---|---|---|---|---|---|
| 6 | −6.7773E+01 | 3.2983E−05 | −2.0963E−07 | 1.5501E−09 | −6.7453E−12 | 1.4909E−14 |
| 26 | −6.5698E+00 | −8.4800E−05 | 3.4211E−07 | −3.8073E−09 | 3.0807E−11 | −1.6293E−13 |

Numerical Example 4
f = 18.6~193.5
Fno = 3.6~5.88

| | Surface Number (i) | Curvature Radius (ri) | Center Thickness or Distance (di) | Refractive Index (ndi) | Abbe Number (vdi) |
|---|---|---|---|---|---|
| L1 | 1 | 114.17 | 1.40 | 1.801 | 34.97 |
| | 2 | 55.36 | 8.69 | 1.497 | 81.54 |
| | 3 | −305.20 | 0.12 | | |
| | 4 | 46.72 | 5.97 | 1.487 | 70.23 |
| | 5 | 132.15 | Variable | | |
| L2 | 6 | 60.37 | 1.20 | 1.772 | 49.6 |
| | 7 | 13.66 | 5.03 | | |
| | 8 | −72.99 | 1.00 | 1.883 | 40.76 |
| | 9 | 42.78 | 0.15 | | |
| | 10 | 20.76 | 4.24 | 1.847 | 23.93 |
| | 11 | −44.19 | 0.72 | | |
| | 12 | −25.22 | 1.00 | 1.804 | 46.57 |
| | 13 | 43.35 | Variable | | |
| L3 | 14 | Stop | 1.59 | | |
| | 15 | 31.52 | 3.21 | 1.487 | 70.23 |
| | 16 | −24.10 | 0.07 | | |
| | 17 | 24.95 | 3.51 | 1.497 | 81.54 |
| | 18 | −19.95 | 0.90 | 1.805 | 25.42 |
| | 19 | −76.79 | Variable | | |
| L4 | 20 | −54.18 | 1.92 | 1.847 | 23.93 |
| | 21 | −15.27 | 0.80 | 1.772 | 49.6 |
| | 22 | 41.45 | 5.12 | | |
| | 23 | −14.22 | 1.20 | 1.713 | 53.87 |
| | 24 | −29.64 | Variable | | |
| L5 | 25 | 101.23 | 6.90 | 1.497 | 81.54 |
| | 26 | −17.01 | 0.10 | | |
| | 27 | 38.39 | 6.34 | 1.487 | 70.23 |
| | 28 | −28.69 | 0.20 | | |

-continued

|  | 29 | −26.11 | 1.63 | 1.834 | 37.16 |
|---|---|---|---|---|---|
|  | 30 | −183.51 | Variable |  |  |

|  | Wide-angle End | Midpoint | Telephoto End |
|---|---|---|---|
| f | 18.6 | 51.4 | 193.5 |
| d5 | 1.84 | 28.89 | 58.33 |
| d13 | 22.80 | 11.35 | 2.41 |
| d19 | 2.89 | 6.62 | 9.80 |
| d24 | 7.35 | 3.62 | 0.45 |

Aspheric Surface Data

| Surface Number | k | $C_4$ | $C_6$ | $C_8$ | $C_{10}$ | $C_{12}$ |
|---|---|---|---|---|---|---|
| 6 | −1.8563E+01 | 1.2877E−05 | −7.0611E−08 | 6.0212E−10 | −2.9916E−12 | 7.2459E−15 |
| 26 | −3.8918E+00 | −8.0590E−05 | 3.2158E−07 | −1.1407E−09 | 1.7877E−12 | −1.0661E−16 |

Numerical Example 5
f = 18.6~193.5
Fno = 3.6~5.88

|  | Surface Number (i) | Curvature Radius (ri) | Center Thickness or Distance (di) | Refractive Index (ndi) | Abbe Number (vdi) |
|---|---|---|---|---|---|
| L1 | 1 | 129.73 | 1.40 | 1.750 | 35.33 |
|  | 2 | 58.09 | 8.53 | 1.497 | 81.54 |
|  | 3 | −351.10 | 0.12 |  |  |
|  | 4 | 53.72 | 6.39 | 1.487 | 70.23 |
|  | 5 | 261.49 | Variable |  |  |
| L2 | 6 | 71.45 | 1.20 | 1.772 | 49.6 |
|  | 7 | 14.14 | 5.10 |  |  |
|  | 8 | −80.18 | 1.00 | 1.883 | 40.76 |
|  | 9 | 40.21 | 0.15 |  |  |
|  | 10 | 20.87 | 4.44 | 1.847 | 23.93 |
|  | 11 | −43.83 | 0.72 |  |  |
|  | 12 | −26.55 | 1.00 | 1.804 | 46.57 |
|  | 13 | 40.38 | Variable |  |  |
| L3 | 14 | Stop | 1.52 |  |  |
|  | 15 | 30.19 | 3.19 | 1.487 | 70.23 |
|  | 16 | −26.91 | −0.02 |  |  |
|  | 17 | 22.93 | 3.73 | 1.497 | 81.54 |
|  | 18 | −19.83 | 0.90 | 1.805 | 25.42 |
|  | 19 | −207.70 | Variable |  |  |
| L4 | 20 | −64.95 | 3.00 | 1.847 | 23.93 |
|  | 21 | −16.49 | 0.80 | 1.713 | 53.87 |
|  | 22 | 49.56 | 1.14 |  |  |
|  | 23 | −32.25 | 1.20 | 1.603 | 60.64 |
|  | 24 | −305.37 | Variable |  |  |
| L5 | 25 | 36.18 | 5.97 | 1.497 | 81.54 |
|  | 26 | −24.12 | 0.16 |  |  |
|  | 27 | 88.10 | 4.28 | 1.487 | 70.23 |
|  | 28 | −27.86 | 1.16 |  |  |
|  | 29 | −19.31 | 1.63 | 1.834 | 37.16 |
|  | 30 | −65.40 | Variable |  |  |

|  | Wide-angle End | Midpoint | Telephoto End |
|---|---|---|---|
| f | 18.6 | 53.8 | 193.5 |
| D5 | 1.80 | 25.37 | 58.74 |
| d13 | 24.09 | 10.85 | 2.44 |
| d19 | 0.79 | 4.27 | 7.45 |
| d24 | 12.19 | 8.72 | 5.54 |

Aspheric Surface Data

| Surface Number | k | $C_4$ | $C_6$ | $C_8$ | $C_{10}$ | $C_{12}$ |
|---|---|---|---|---|---|---|
| 6 | 3.7753E+00 | 8.8440E−07 | −3.2124E−08 | 3.6407E−10 | −1.8040E−12 | 4.1841E−15 |
| 26 | −2.4122E+01 | −5.9677E−05 | 2.5132E−07 | −1.0038E−09 | 4.9341E−14 | 4.7438E−15 |

-continued

Numerical Example 6
f = 18.6~193.5
Fno = 3.6~5.88

|  | Surface Number (i) | Curvature Radius (ri) | Center Thickness or Distance (di) | Refractive Index (ndi) | Abbe Number (vdi) |
|---|---|---|---|---|---|
| L1 | 1 | 118.20 | 1.40 | 1.801 | 34.97 |
|  | 2 | 55.08 | 8.99 | 1.497 | 81.54 |
|  | 3 | −250.36 | 0.12 |  |  |
|  | 4 | 45.15 | 6.15 | 1.487 | 70.23 |
|  | 5 | 142.12 | Variable |  |  |
| L2 | 6 | 99.02 | 1.20 | 1.772 | 49.6 |
|  | 7 | 16.01 | 4.82 |  |  |
|  | 8 | −54.87 | 1.00 | 1.883 | 40.76 |
|  | 9 | 29.77 | 0.15 |  |  |
|  | 10 | 22.69 | 4.47 | 1.847 | 23.93 |
|  | 11 | −30.49 | 0.79 |  |  |
|  | 12 | −19.94 | 1.00 | 1.804 | 46.57 |
|  | 13 | 98.22 | Variable |  |  |
| L3 | 14 | Stop | 1.59 |  |  |
|  | 15 | 45.19 | 2.78 | 1.487 | 70.23 |
|  | 16 | −30.75 | 0.07 |  |  |
|  | 17 | 25.98 | 3.75 | 1.497 | 81.54 |
|  | 18 | −20.33 | 0.90 | 1.805 | 25.42 |
|  | 19 | −50.58 | 3.38 |  |  |
|  | 20 | −30.96 | 1.80 | 1.847 | 23.93 |
|  | 21 | −18.47 | 0.80 | 1.652 | 58.55 |
|  | 22 | 49.25 | Variable |  |  |
| L4 | 23 | 54.06 | 4.65 | 1.497 | 81.54 |
|  | 24 | −31.00 | 0.14 |  |  |
|  | 25 | 7317.62 | 4.69 | 1.487 | 70.23 |
|  | 26 | −20.64 | 0.06 |  |  |
|  | 27 | −25.68 | 1.63 | 1.834 | 37.16 |
|  | 28 | −108.31 | Variable |  |  |

|  | Wide-angle End | Midpoint | Telephoto End |
|---|---|---|---|
| f | 18.6 | 53.8 | 193.5 |
| d5 | 1.91 | 28.62 | 54.28 |
| d13 | 24.06 | 11.28 | 1.79 |
| d22 | 15.23 | 8.29 | 4.29 |

Aspheric Surface Data

| Surface Number | k | $C_4$ | $C_6$ | $C_8$ | $C_{10}$ | $C_{12}$ |
|---|---|---|---|---|---|---|
| 6 | 4.7773E+01 | −2.1576E−06 | −5.3953E−08 | 5.3305E−10 | −1.6778E−12 | −1.3468E−15 |
| 20 | −6.1969E+00 | −1.8989E−05 | 5.4468E−08 | 0.0000E+00 | 0.0000E+00 | 0.0000E+00 |
| 24 | −1.3488E+01 | −3.2047E−05 | 3.2186E−07 | −9.4741E−10 | −1.0337E−13 | 1.1048E−14 |

TABLE 1

| Condition | Numerical Example 1 | Numerical Example 2 | Numerical Example 3 | Numerical Example 4 | Numerical Example 5 | Numerical Example 6 |
|---|---|---|---|---|---|---|
| (1) | 0.121 | 0.124 | 0.149 | 0.174 | 0.140 | 0.172 |
| (2) | 2.53 | 2.43 | 2.15 | 3.80 | 2.92 | 2.23 |
| (3) | 0.051 | 0.051 | 0.049 | 0.069 | 0.069 | 0.066 |
| (4) | 0.383 | 0.389 | 0.393 | 0.517 | 0.515 | 0.483 |

As described above, in embodiments 1 through 6, an appropriate distribution of refractive power among the lens units and an appropriate arrangement of the lens units are made. At the same time, the lens unit IS which is relatively compact and lightweight and constitutes all or part of the rear lens group Lr serves as an image stabilizing lens unit. Then, by moving the lens unit IS in a direction having a component perpendicular to the optical axis, image blur caused by vibration (or inclination) of the zoom lens is corrected. Thus, it is possible to achieve a zoom lens that is compact in overall size, has a simple mechanism, causes less load on a driving unit, and is capable of effectively correcting eccentric aberration generated when the lens units are eccentrically moved.

Next, with reference to FIG. 31, there will be described an exemplary embodiment in which a zoom lens of one of embodiments 1 through 6 of the present invention is used as a photographing optical system.

Figure 31:
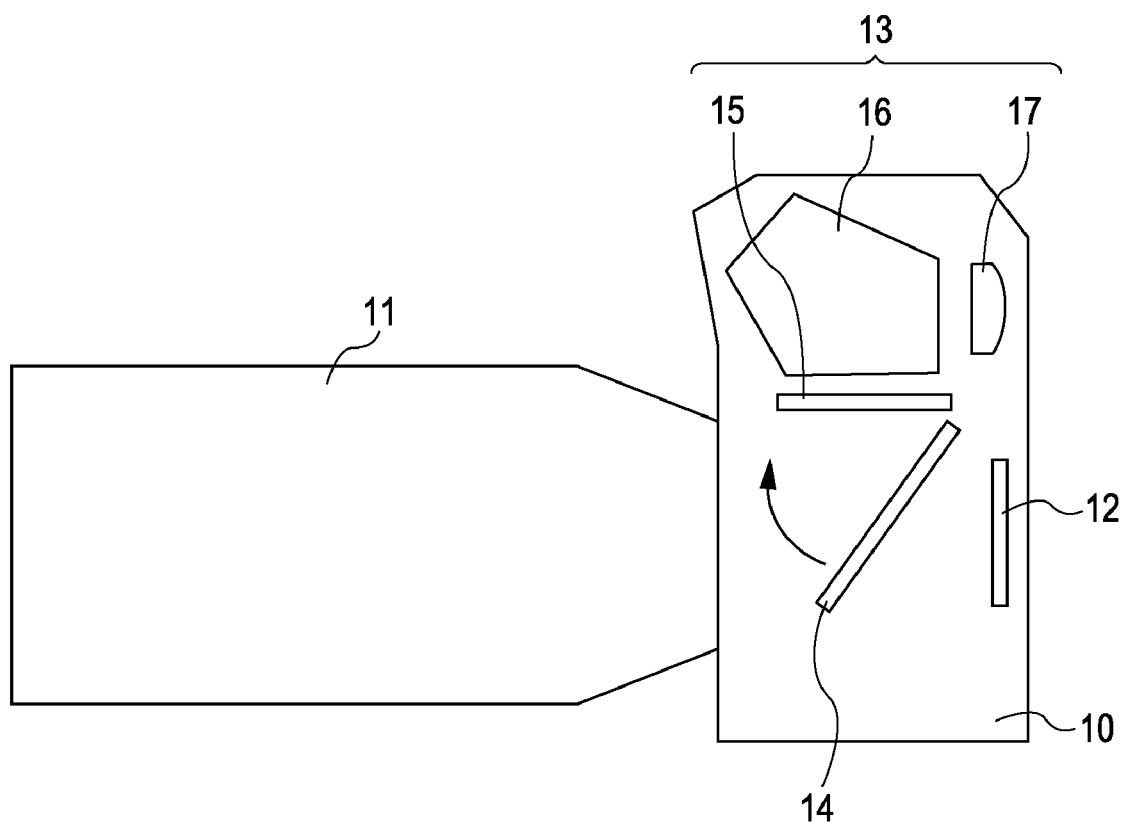
FIG. 31 is a schematic diagram of a camera (image pickup apparatus) including a zoom lens according to at least one embodiment of the present invention.

FIG. 31 illustrates a main body 10 of a single-lens reflex camera and an interchangeable lens 11, comprising a zoom lens of one of embodiments 1 through 6. FIG. 31 further illustrates a photosensitive surface 12, a finder optical system 13, a quick return mirror 14, a focusing plate 15, a pentaprism 16, and an eyepiece 17.

The photosensitive surface 12 is a photosensitive surface of, for example, a silver-halide film on which a subject image obtained through the interchangeable lens 11 is recorded, or a solid-state image pickup element (photoelectric conversion element) which detects a subject image. The finder optical system 13 is used to observe a subject image from the interchangeable lens 11. The quick return mirror 14 rotates to allow a subject image from the interchangeable lens 11 to impinge upon the photosensitive surface 12 or direct it to the finder optical system 13. When a subject image is to be observed through the finder, the subject image formed on the focusing plate 15 via the quick return mirror 14 is reversed by the pentaprism 16, magnified by the eyepiece 17, and then observed. For photographing, the quick return mirror 14 rotates in the direction of an arrow in FIG. 31 to allow the subject image to be formed on the photosensitive surface 12 and recorded.

Thus, by including a zoom lens of one of embodiments 1 through 6 of the present invention in an optical device, such as an interchangeable lens for a single-lens reflex camera, an optical device with high optical performance can be realized.

The present invention is also applicable to a single-lens reflex camera having no quick return mirror.

A zoom lens of at least one embodiment of the present invention may also be included in a video camcorder.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-051331 filed Mar. 1, 2007, which is hereby incorporated by reference herein in its entirety.

What is claimed is:

1. A zoom lens comprising, in order from an object side to an image side:
   a first lens unit having positive refractive power;
   a second lens unit having negative refractive power; and
   a rear lens group including at least one lens unit having positive refractive power,
   wherein the rear lens group includes a lens unit IS having negative refractive power which is movable in a direction having a component perpendicular to an optical axis so as to displace an imaging position, and a lens unit R_IS having positive refractive power and arranged on the image side of the lens unit IS,
   the distance between the lens unit IS and the lens unit R_IS being variable during zooming, and wherein
   the following conditions are satisfied:

$0.05<|fIS/fT|<0.18$ $2.0<f1/fR\_IS<4.5$ where fIS is a focal length of the lens unit IS, fT is a focal length of the entire zoom lens at a telephoto end, f1 is a focal length of the first lens unit, and fR_IS is a focal length of the lens unit R_IS.

2. The zoom lens according to claim 1, further comprising an aperture stop arranged on the object side of the rear lens group.

3. The zoom lens according to claim 1, further comprising an aperture stop arranged in the rear lens group.

4. The zoom lens according to claim 1, wherein the rear lens group comprises
   a third lens unit having positive refractive power,
   a fourth lens unit having negative refractive power, and
   a fifth lens unit having positive refractive power,
   wherein the fourth lens consists of or includes the lens unit IS, and the fifth lens unit consists of the lens unit R_IS.

5. The zoom lens according to claim 1, wherein the rear lens group comprises
   a third lens unit having positive refractive power,
   a fourth lens unit having positive refractive power,
   a fifth lens unit having negative refractive power, and
   a sixth lens unit having positive refractive power,
   wherein the fifth lens unit consists of the lens unit IS, and the sixth lens unit consists of the lens unit R_IS.

6. The zoom lens according to claim 1, wherein the rear lens group comprises
   a third lens unit having positive refractive power, and
   a fourth lens unit having positive refractive power,
   wherein the third lens unit includes the lens unit IS, and the fourth lens unit consists of the lens unit R_IS.

7. The zoom lens according to claim 1, wherein the condition $0.30<f1/fT<0.60$ is satisfied.

8. The zoom lens according to claim 1, wherein the condition $0.01<|f2/fT|<0.1$ is satisfied, where f2 is a focal length of the second lens unit.

9. The zoom lens according to claim 1, wherein an image is formed on a solid-state image pickup element.

10. An image pickup apparatus comprising:
    a zoom lens comprising, in order from an object side to an image side:
    a first lens unit having positive refractive power;
    a second lens unit having negative refractive power; and
    a rear lens group including at least one lens unit having positive refractive power,
    wherein the rear lens group includes a lens unit IS having negative refractive power which is movable in a direction having a component perpendicular to an optical axis so as to displace an imaging position, and a lens unit R_IS having positive refractive power and arranged on the image side of the lens unit IS,
    the distance between the lens unit IS and the lens unit R_IS being variable during zooming, and wherein
    the following conditions are satisfied:

$0.05<|fIS/fT|<0.18$ $2.0<f1/fR\_IS<4.5$ where fIS is a focal length of the lens unit IS, fT is a focal length of the entire zoom lens at a telephoto end, f1 is a focal length of the first lens unit, and fR_IS is a focal length of the lens unit R_IS, and a solid-state image pickup element for detecting an image formed by the zoom lens.

* * * * *